(12) United States Patent
Seol et al.

(10) Patent No.: US 9,218,159 B2
(45) Date of Patent: Dec. 22, 2015

(54) MEMORY SYSTEM GENERATING RANDOM NUMBER AND METHOD GENERATING RANDOM NUMBER

(71) Applicants: Changkyu Seol, Osan-Si (KR); Junjin Kong, Yongin-Si (KR); Hong Rak Son, Anyang-Si (KR); Pilsang Yoon, Hwaseong-Si (KR)

(72) Inventors: Changkyu Seol, Osan-Si (KR); Junjin Kong, Yongin-Si (KR); Hong Rak Son, Anyang-Si (KR); Pilsang Yoon, Hwaseong-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 271 days.

(21) Appl. No.: 13/685,743

(22) Filed: Nov. 27, 2012

(65) Prior Publication Data

US 2014/0037086 A1 Feb. 6, 2014

(30) Foreign Application Priority Data

Jul. 31, 2012 (KR) ........................ 10-2012-0084064

(51) Int. Cl.
*H04L 9/08* (2006.01)
*G06F 7/58* (2006.01)

(52) U.S. Cl.
CPC ........ *G06F 7/58* (2013.01); *G06F 7/588* (2013.01); *H04L 9/08* (2013.01); *H04L 9/0869* (2013.01); *H04L 2209/12* (2013.01)

(58) Field of Classification Search
USPC .................................... 380/44; 708/250–256
See application file for complete search history.

(56) References Cited

U.S. PATENT DOCUMENTS

| | | | |
|---|---|---|---|
| 7,599,976 B1 | 10/2009 | Logue et al. | |
| 7,617,065 B2 | 11/2009 | Kim et al. | |
| 2007/0230702 A1 | 10/2007 | Puri | |
| 2008/0263369 A1 | 10/2008 | Min et al. | |
| 2009/0165086 A1* | 6/2009 | Trichina et al. | 726/2 |
| 2010/0103742 A1* | 4/2010 | Hwang et al. | 365/185.22 |
| 2011/0246792 A1 | 10/2011 | Weingarten | |

OTHER PUBLICATIONS

U.S. Appl. No. 13/957,652, Filed Aug. 1, 2015.

* cited by examiner

*Primary Examiner* — Jeffrey Pwu
*Assistant Examiner* — Samuel Ambaye
(74) *Attorney, Agent, or Firm* — Volentine & Whitt, PLLC

(57) ABSTRACT

In a memory of non-volatile memory cells, a random number is generated by programming non-volatile memory cells, reading the programmed non-volatile memory cells using a random number read voltage selected in accordance with a characteristic of the non-volatile memory cells to generate random read data, and generating the random number from the random read data.

22 Claims, 17 Drawing Sheets

Fig. 6

| RN1 | 0 1 1 0 | · · · | 0 0 1 |
|-----|---------|-------|-------|
| RN2 | 1 0 1 0 | · · · | 1 1 1 |
| RN3 | 1 1 0 1 | · · · | 1 0 1 |
| KEY | 0 0 0 1 | · · · | 0 1 1 |

(KEY = RN1 ⊕ RN2 ⊕ RN3)

MEMORY SYSTEM GENERATING RANDOM NUMBER AND METHOD GENERATING RANDOM NUMBER

CROSS-REFERENCE TO RELATED APPLICATIONS

A claim of priority is made under 35 U.S.C. §119 to Korean Patent Application No. 10-2012-0084064 filed Jul. 31, 2012, the subject matter of which is hereby incorporated by reference.

BACKGROUND

The inventive concept relates generally to semiconductor memory devices and memory systems. More particularly, the inventive concept relates to memory systems and methods of operating a memory system that are capable of generating a random number using a characteristic of constituent nonvolatile memory cells.

Semiconductor memory devices may be generally classified as volatile or nonvolatile according to their operative nature. Volatile memory devices lose stored data in the absence of applied power, while nonvolatile memory devices are able to retain stored data even when power is no longer applied.

There are different kinds of nonvolatile memory devices, including for example, the mask read-only memory (MROM), programmable read-only memory (PROM), erasable programmable read-only memory (EPROM), and electrically erasable programmable read-only memory (EEPROM). Flash memory is a particular type of EEPROM and has been widely used in a great variety of digital systems, such as computers, cellular phones, PDAs, digital cameras, camcorders, voice recorders, MP3 players, handheld PCs, games, facsimiles, scanners, printers, and the like.

Data security is almost always an important consideration in the design and operation of a memory system. Increasingly sophisticated attacks (e.g., probing, fault injection, power analysis, and the like) seeking to copy or corrupt source code, stored user data, and/or host system data are a constant threat during the operation of digital systems. Accordingly, there is an ongoing need to encrypt the data stored by contemporary memory devices. Incoming data received by a memory system from a host, for example, is encrypted using an encryption key. Thereafter, when the data is read from memory and provided to the host it is decrypted using the same encryption (/decryption) key. An encryption key may be variously defined or generated in accordance with user-provided information (e.g., a password), security code, one or more random number(s), or some combination of these or similar digital value(s). Many contemporary memory systems make use of at least one random number as a computational seed or variable during the generation of an encryption key.

However, the generation and provision of a truly random number is not a trivial matter. Indeed, the generation of a random number in contemporary memory systems is particularly troublesome given the memory system requirements of small size and modest power consumption. In many conventional instances, the random number used to generate an encryption key is generated and provided by a separate random number generating circuit. The term "separate random number generating circuit" is used hereafter to denote circuits and related control software that are uniquely or principally provided to generate a random number. Separate random number generating circuits may be quite large in size and a great variety of such circuits are understood by those skilled in the art.

SUMMARY

In one embodiment the inventive concept provides a method generating a random number in a memory of non-volatile memory cells, the method comprising; programming the non-volatile memory cells, reading the programmed non-volatile memory cells using a random number read voltage selected in accordance with a characteristic of the non-volatile memory cells to generate random read data, and generating the random number from the random read data.

In another embodiment the inventive concept provides a method, comprising; obtaining random read data from programmed non-volatile memory cells using a random number read voltage selected in view of a characteristic of the non-volatile memory cells.

In another embodiment the inventive concept provides an encryption key generation method, comprising; programming non-volatile memory cells using a program voltage, wherein each of the non-volatile memory cells is specified to exhibit a threshold voltage falling within a nominal threshold voltage distribution in response to the programming, generating random read data by reading the programmed non-volatile memory cells using at least one random number read voltage falling within the nominal threshold voltage distribution, applying the random read data to a key generator as a random number, and using the key generator to generate the encryption key.

In another embodiment the inventive concept provides a memory, comprising; a memory cell array including non-volatile memory cells, a program voltage generator that during a programming operation applies a program voltage to a selected word line of the memory cell array, and a random number read voltage generator that during a random number generation operation applies a random number read voltage to the selected word line, wherein a level of the random number read voltage is selected to be within a nominal threshold voltage distribution expected for the non-volatile memory cells when programmed.

In another embodiment the inventive concept provides a memory, comprising; a memory cell array including non-volatile memory cells, a program voltage generator that during a programming operation applies a program voltage to a selected word line of the memory cell array, and a random number read voltage generator that during a random number generation operation applies a random number read voltage to the selected word line, wherein the random number read voltage is a program verification voltage used to determine a slow cell response by at least one of the non-volatile memory cells during programming of the non-volatile memory cells.

In another embodiment the inventive concept provides a memory system generating a random number without using a separate random number generating circuit, the system comprising; a control unit that receives incoming data and corresponding address information, a security circuit that generates encrypted data from the incoming data using the address information and an encryption key, a memory including non-volatile memory cells that stores the encrypted data, and provides the random number when the nonvolatile memory cells are read using a random number read voltage, wherein the random number read voltage is selected to be within a nominal threshold voltage distribution for the non-volatile memory cells when programmed, and a key generator that generates the encryption key from the random number.

In another embodiment the inventive concept provides a memory system generating a random number without using a separate random number generating circuit, the system comprising; a control unit that receives incoming data and corresponding address information, a security circuit that generates encrypted data from the incoming data using the address information and an encryption key, a memory including nonvolatile memory cells that stores the encrypted data, and provides the random number when the nonvolatile memory cells are read using a random number read voltage, wherein the random number read voltage is a programming verification voltage used to determine a slow cell for at least one of the non-volatile memory cells during the programming of the non-volatile memory cells, and a key generator that generates the encryption key from the random number.

In another embodiment the inventive concept provides a system, comprising; a host that provides incoming data and corresponding address information and a memory card. The memory card comprises; a card controller that generates encrypted data from the incoming data using the address information and an encryption key, a memory including flash memory cells that stores the encrypted data and provides a random number when the flash memory cells are read using a random number read voltage, wherein the random number read voltage is selected in accordance with a characteristic of the non-volatile memory cells, and a key generator that generates the encryption key from the random number.

In another embodiment the inventive concept provides a system, comprising a host that provides incoming data and corresponding address information, and a solid state drive (SSD). The SSD comprises a SSD controller that generates encrypted data from the incoming data using the address information and an encryption key, a memory including flash memory cells that store the encrypted data and provide a random number when the flash memory cells are read using a random number read voltage, wherein the random number read voltage is selected in accordance with a characteristic of the non-volatile memory cells, and a key generator that generates the encryption key from the random number.

BRIEF DESCRIPTION OF THE DRAWINGS

Certain embodiments of the inventive concept will be described hereafter with reference to the accompanying drawings.

FIG. 6 is a table illustrating the generation of an encryption key from multiple random numbers (random read data) generated by a method consistent with embodiments of the inventive concept.

DETAILED DESCRIPTION

Figure 1:
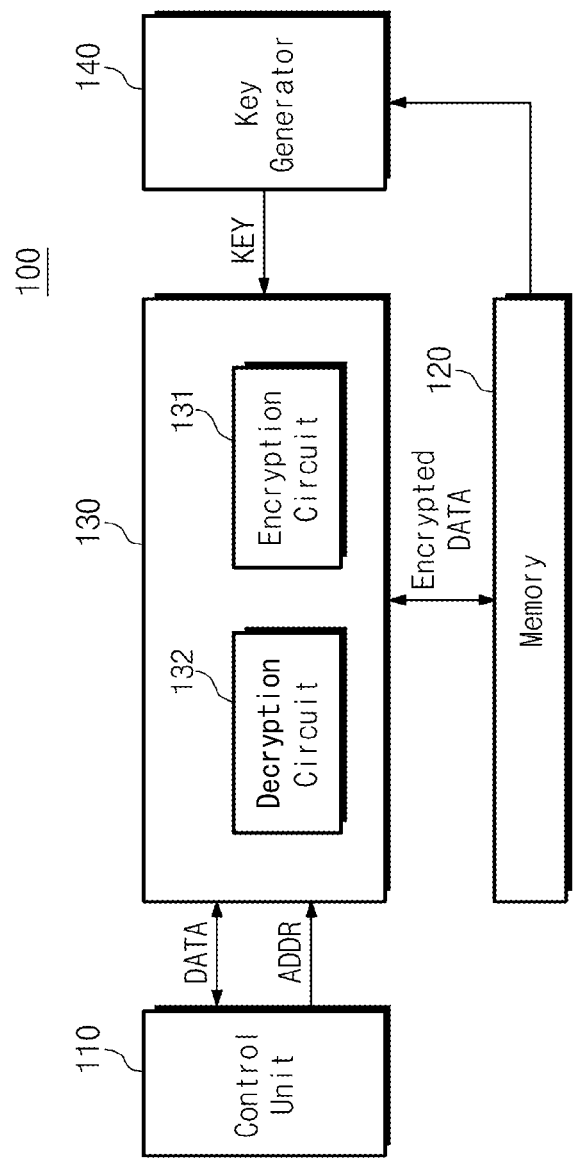
FIG. 1 is a block diagram illustrating a memory system according to an embodiment of the inventive concept.

Certain embodiments of the inventive concept will now be described in some additional detail with reference to the accompanying drawings. The inventive concept, however, may be embodied in various different forms and should not be construed as being limited to only the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the illustrated embodiments. Unless otherwise noted, like reference numerals denote like or similar elements throughout the drawings and written description.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram generally illustrating a memory system according to an embodiment of the inventive concept. Referring to FIG. 1, a memory system 100 comprises; a control unit 110, a memory 120 including constituent nonvolatile memory cells, a security circuit 130, and a key generator 140. In the illustrated embodiment, the element indicated as security circuit 130 denotes a broad class of circuits and related control software designed to protect the data stored in the memory 120 from attack by encrypting the data during or before the programming (or writing) of the data to the memory 120.

In this regard, the control unit 110 controls the overall operation of the memory system 100 during data processing and computational operations. The memory 120 may be used to store programming code used to control the operation of the control unit 110 and/or other components of the memory system 100. Additionally or alternately, the memory 120 may be used to store user-provided and/or external host-provided data (DATA).

The memory 120 will include at least some nonvolatile memory cells, but may include volatile as well as nonvolatile memory components, and may include a random access memory (RAM) and/or a read only memory (ROM). More particularly, in certain embodiments of the inventive concept, the memory 120 will be a flash memory configured from one or more flash memory devices. For example, NOR flash memory devices and/or NAND flash memory devices may be used to configure the memory 120. Although certain illustrated embodiments of the inventive concept will be described under an assumption that memory 120 is a flash memory, the scope of the inventive concept is not limited to only flash memory configurations.

As will appreciated by those skilled in the art, the control unit 110 may be used to receive data (DATA) along with corresponding address information (ADDR). The incoming data and address are then passed from the control unit 110 to the security circuit 130, possibly through one or more buffer component(s) (not shown). The security circuit 130 may be used to perform two primary functions: (1) the encryption of incoming data to generate "encrypted data" during or in relation to a program (or write) operation; and (2) the decryption of read data retrieved from the memory 120 to generate "decrypted data" during or in relation to a read operation. Accordingly, the block diagram of FIG. 1 generally shows the security circuit 130 as including an encryption circuit 131 and a decryption circuit 132. In this context, however, the term "circuit" encompasses not only hardware components, but also related software and/or firmware components.

In one assumed exemplary operation, the encryption circuit 131 receives the address information (ADDR) from the control unit 110 or intervening buffer component and an encryption key (KEY) from the key generator 140 or an intervening register or memory (e.g., memory 120) used to store the encryption key. These information values (ADDR and KEY) may then be used to encrypt the incoming data and generate the encrypted data to-be-programmed to the memory 120.

The key generator 140 used in the memory system 100 of FIG. 1 may be conventional in nature. Those skilled in the art understand that a broad range of circuits and/or software may be used to generate one or more encryption key(s) for use by the encryption circuit 131. However, within the context of the inventive concept the key generator 140 requires at least one random number in order to generate a useful encryption key. In the illustrated embodiment of FIG. 1, a random number (RN) is provided from the memory 120 to the key generator 140. That is, in certain embodiments of the inventive concept, a random number (RN) may be provided as "random read data" (RD) retrieved from the memory 120, wherein the random read data is essentially randomized as a function of one or more characteristics of the constituent nonvolatile memory cells of the memory 120.

By obtaining a number that is truly random as a function of the inherent, yet unpredictable, characteristics of constituent nonvolatile memory cells, embodiments of the inventive concept do not require the provision or use of a separately provided random number generating circuit. Further, certain computational functions (e.g., the timing of a particular memory operation) conventionally performed by (e.g.,) the control unit 110 in order to generate a random number need not be performed, thereby reducing programming and operational overhead.

The key generator 140 may generate one or more encryption key(s) using the random number obtained from the memory 120 in conjunction with other data, such as user-provided data (e.g., a password), host-provided data, etc.

Figure 2:
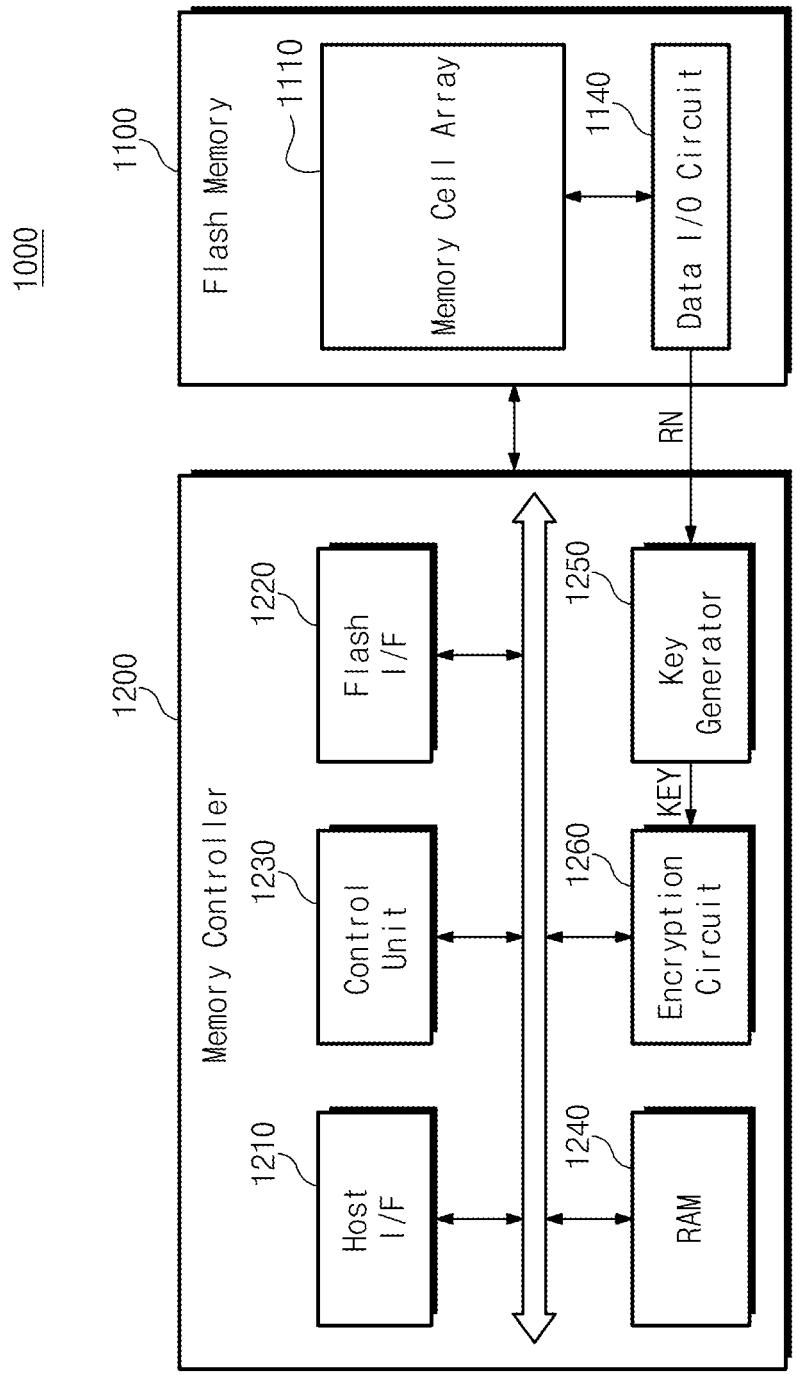
FIG. 2 is a block diagram illustrating a flash memory system according to an embodiment of the inventive concepts.

FIG. 2 is a block diagram more specifically illustrating a flash memory system according to an embodiment of the inventive concept. Referring to FIG. 2, a flash memory system 1000 generally comprises; a flash memory 1100 and a memory controller 1200. The flash memory system 1000 may be implemented as a flash memory based data storage device, such as a memory card, a USB memory, a solid state drive (SSD), and the like.

The flash memory 1100 performs erase, program, and/or read operation(s) under the control of the memory controller 1200 and may be generally understood as including a memory cell array 1110 including constituent flash memory cells, and a data input/output (I/O) circuit 1140. Under these assumptions, the flash memory 1100 may perform erase operations on a memory block basis, and perform program and/or read operations on a page basis.

The memory controller 1200 controls erase, program and read operations performed by the flash memory 1100 in response to a request indicated (e.g.,) by a command or collection of control signals received from an external host. In the illustrated example of FIG. 2, the memory controller 1200 comprises; a host interface 1210, a flash interface 1220, a control unit 1230, a RAM 1240, a key generator 1250, and an encryption circuit 1260.

The host interface 1210 may be used to interface with the host according to one or more data communication protocol(s), and the flash interface 1220 may be used to interface with the flash memory 1100. The memory controller 1200 may be connected with the host via one or more signal paths including a parallel ATA bus, serial ATA bus, SCSI, USB, PCIe, and the like.

The control unit 1230 may be conventionally used to control the overall operation of the flash memory system 1000 including erase operations, read operations, program operations, file system management, housekeeping operations, and the like performed by flash memory 1100. For example, although not shown in FIG. 2, the control unit 1230 may include a Central Processing Unit (CPU), processor, and/or controller, as well as related data and computational circuits (e.g., registers, data buffers, scratch pad memory, etc.).

The RAM 1240 may be used in conjunction with and under the control of the control logic 1230. It may be used as a work memory, buffer memory, cache memory, and the like. When used as the work memory, data being processed by the control unit 1230 may be temporarily stored at the RAM 1240. When used as the buffer memory, the RAM 1240 may be used to buffer data being exchanged between the memory controller 1200 and the host, and/or between the memory controller 1200 and the flash memory 1100. When used as the cache memory, the RAM 1240 may enable the relatively low-speed flash memory 1100 to operate in conjunction with data being received according to a data communication protocol specifying a relatively high speed transmission of data.

In certain embodiments of the inventive concept, the RAM 1240 may be used as a drive memory for a flash translation layer (FTL) operating in relation to the flash memory system 1000. Those skilled in the art understand the potential incorporation of a FTL to manage merge operations, administer mapping table(s), perform address conversion(s), and the like, in relation to the operation of the flash memory 1100.

Consistent with the foregoing, the key generator 1250 may be used to generate one or more encryption keys for use by the encryption circuit 1260. That is, the key generator 1250 may generate an encryption key using a random number (RN) received from the flash memory 1100. The key generator 1250 may generate the encryption key(s) from the random number (RN) using one or more conventionally understood methods. For example, the key generator 1250 may logically combine user-provided (or host-provided) information with the random number to generate the encryption key(s).

Using the one or more encryption keys, the encryption circuit 1260 may encrypt incoming data to generate the encrypted data ultimately programmed to the memory cell array 1110 of the flash memory 1100. However, unlike conventional memory systems incorporating key generators, the flash memory system of FIG. 2 does not require the use or provision of a separate random number generating circuit in order to generate the random number required by the key generator 1250.

Figure 3:
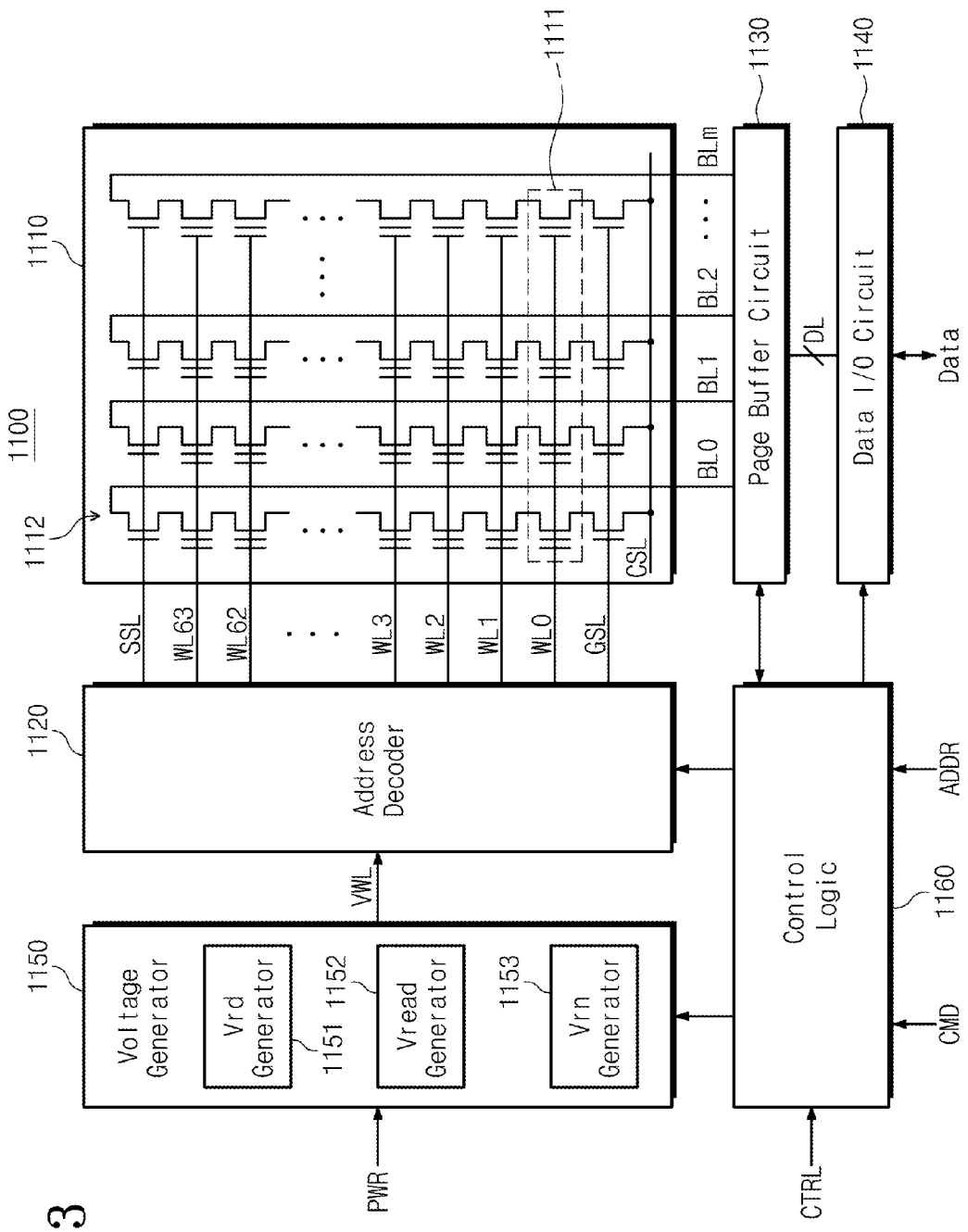
FIG. 3 is a block diagram further illustrating the flash memory system of FIG. 2.

FIG. 3 is a block diagram further illustrating the flash memory 1100 of FIG. 2. Referring to FIG. 3, the flash memory 1100 comprises, in addition to the memory cell array 1110 and Data I/O circuit 1140; an address decoder 1120, a page buffer circuit 1130, a voltage generator 1150, and control logic 1160.

It is further assumed that the memory cell array 1110 is functionally divided into (e.g., accessed according to) a plurality of memory blocks. Only one memory block is shown in relevant portion within the memory cell array 1110 of FIG. 3. It is further assumed that each memory block includes a plurality of defined physical pages. For example, each physical page may be a set of flash memory cells commonly connected to a word line of the memory cell array 1110 (e.g., physical page 1111 of FIG. 3).

It is also assumed that the flash memory cells of the memory cell array 1110 are arranged in a plurality of defined cell strings 1112. Each cell string 1112 includes a string selection transistor connected to a string selection line SSL, a plurality of memory cells respectively connected to a plurality of word lines WL0 to WL63, and a ground selection transistor connected to a ground selection line GSL. For each cell string 1112, the constituent string selection transistor is connected to a corresponding bit line, and the ground selection transistor is connected to a common source line CSL.

In the flash memory 1100, each flash memory cell may be used to store single bit data (i.e., may be operated to store single-bit data as a single-level, flash memory cell, or SLC), or be used to store multi-bit data (i.e., may be operated to store two or more bits of data as a multi-level cell, or MLC). A SLC storing single-bit data will operate in relation to an erase state and a program state, as indicated by respective, corresponding threshold voltage distributions. A MLC storing multi-bit data will operate in relation to an erase state and a plurality of program states, each respectively and correspondingly indicated by a threshold voltage distribution.

In this regard, it should be noted that the respective threshold voltage distributions used to indicate the erase state or a particular program state are nominally defined according to the operating principles of the flash memory system. Thus, an erase state (e.g., a data value of "1") may be indicated for a SLC when its threshold voltage falls within a nominal erase state threshold voltage distribution (i.e., a range of threshold voltage values deemed indicative of the erase state by a specified memory system design). Likewise, the program state (e.g., a data value of "0") may be indicated for the SLC when its threshold voltage falls within a nominal program state threshold voltage distribution (i.e., a range of threshold voltage values deemed indicative of the program state by the memory system design).

Where a flash memory cell is a MLC, each program state (e.g., P1, P2, P3 and P4 for 2-bit MLC) will be indicated when the threshold voltage of the MLC falls within a respective and corresponding nominal program state threshold voltage distribution (i.e., a range of threshold voltage values deemed indicative of the particular program state by the memory system design).

Returning to FIG. 3, the address decoder 1120 is connected to the memory cell array 1110 via a number of control lines (e.g., selection lines SSL and GSL, word lines WL0 to WL63, etc.), and may be used to select a word line (e.g., WL0 in the illustrated example) in response to the address information ADDR.

The page buffer circuit 1130 is connected to the memory cell array 1110 via bit lines BL0 to BLm. The page buffer circuit 1130 may include a plurality of individual page buffers (not shown), where each page buffer is connected to a corresponding bit line in a conventionally understood "all bit line structure". Alternately, two or more page buffers may be connected to a single bit line in a conventionally understood "shield bit line structure". The page buffer circuit 1130 may be used to temporarily store "program data" (e.g., the encrypted data provided by the security circuit 130 of FIG. 1)

to be programmed to the memory cell array 1110 during a program operation, or to temporarily store "read data" retrieved from the memory cell array 1110 during a read operation.

The data I/O circuit 1140 is connected to the page buffer circuit 1130 via data lines DL. Further with respect to FIG. 2, it is assumed that the data I/O circuit 1140 is be connected to the memory controller 1200 via input/output lines. Accordingly, the data I/O circuit 1140 may receive program data from the memory controller 1200 during a program operation, and may pass read data to the memory controller 1200 during a read operation.

As will be described in some additional detail hereafter, the flash memory system of FIG. 3, as well as the more general memory system of FIGS. 1 and 2, may be configured to perform, on an as needed basis, a random number generating operation. That is, in the context of the illustrated embodiment of FIG. 3, a random number may be provided as random read data retrieved from the flash memory 1110 via the page buffer circuit 1130 and data I/O circuit 1140 under the control of control logic 1160.

As will be conventionally appreciated, the voltage generator 1150 may be used to generate various control voltages (e.g., word line voltages) required by the address decoder 1120 and memory cell array 1110 during erase, program and read operations. Further, within embodiments of the inventive concept, the voltage generator 1150 may be used to additionally generate one or more random number read voltage(s) (Vrn). In certain embodiments, the voltage generator begins its operation upon receiving a power-on signal (PWR) from the memory controller 1200. As illustrated in FIG. 3, the voltage generator 1150 may include a selection read voltage generator 1151, a non-selection read voltage generator 1152, and a random number read voltage generator 1153.

The selection read voltage generator 1151 may be used to generate a selection read voltage (Vrd) applied to a selected word line (e.g., WL0) during various operations. The non-selection read voltage generator 1152 may be used to generate a non-selection read voltage (Vread) applied to unselected word lines (e.g., WL1 to WL63) during various operations. For example, the non-selection read voltage (Vread) may have a voltage level sufficient to turn ON a selected memory cell in a selected cell string.

The random number read voltage generator 1153 may be used to generate one or more random number read voltage(s) (Vrn) during a random number generating operation executed by the flash memory system 1100. During the random number generating operation, the random number read voltage generator 1153 generates a defined random number read voltage (Vrn) that is applied to a selected word line WL0, while the non-selection read voltage generator 1152 generates the non-selection read voltage (Vread) applied to unselected word lines WL1 to WL63. In this manner, a particular random number read voltage—defined in view of one or more characteristic(s) of the constituent flash memory cells of the memory cell array 1110—may be applied to the selected word line WL0. The random number generating operation and corresponding provision of at least one random number read voltage (Vrn) will be described in some additional detail with reference to FIGS. 4 and 5.

Returning to FIG. 3, the control logic 1160 may be used to control the programming, reading, and/or erasing of the flash memory 1100 in response to one or more commands (CMD), address(es) ADDR, and control signal(s) CTRL. For example, during a read operation, the control logic 1160 may control the address decoder 1120 to provide the selection read voltage (Vrd) to a read-selected word line WL0, while also providing defined control signals to the page buffer circuit 1130 and data I/O circuit 1140 in order to read data programmed at the selected page 1111. During the random number generating operation, the control logic 1160 may be used to control the generation of a random number by providing one or more random number read voltage(s) (Vrn) to the selected word line WL0.

In the context of the inventive concept, the phrase "characteristic(s) of the nonvolatile memory cell (or cells)" has particular meaning. Those skilled in the art will recognize that practical nonvolatile memory cells arrays include a large number of individual SLC or MLC memory cells. Ideally, each nonvolatile memory cell in the memory cell array would be identical in its physical nature and operational performance to each and every other memory cell in the memory cell array. However, this is not practically possible.

In reality, each memory cell vary in its unique, inherent performance characteristic(s) due to location in the memory cell array, variation in the fabrication process(es) used to manufacture the memory cells, as well as temperature, noise and voltage variations across the memory cell array, etc. Hence, even adjacent (or closely neighboring) memory cells in a memory cell array may respond in characteristically different ways to the application of substantially identical control signals. For example, the same control voltages and/or currents applied to a group of nonvolatile memory cells (e.g., a page of nonvolatile memory cells) during a program operation, and thereby intended to similarly program each nonvolatile memory cell in the group, may nonetheless result in substantially different threshold voltages for the individual memory cells in the group. However, these different threshold voltages will usually fall within a defined threshold voltage distribution for the nonvolatile memory cell.

Thus, the specific, respective, post-programming threshold voltage exhibited by a nonvolatile memory cell in relation to applied control signals is a "characteristic of the nonvolatile memory cell". In similar manner, the specific, respective, post-erasure threshold voltage exhibited by individual nonvolatile memory cells is another characteristic of the nonvolatile memory cell. Alternately, the speed with which individual nonvolatile memory cells assume a defined programming state (i.e., the "slow" or "fast" programming response of the memory cell) is yet another characteristic of the nonvolatile memory cell.

Figure 4:
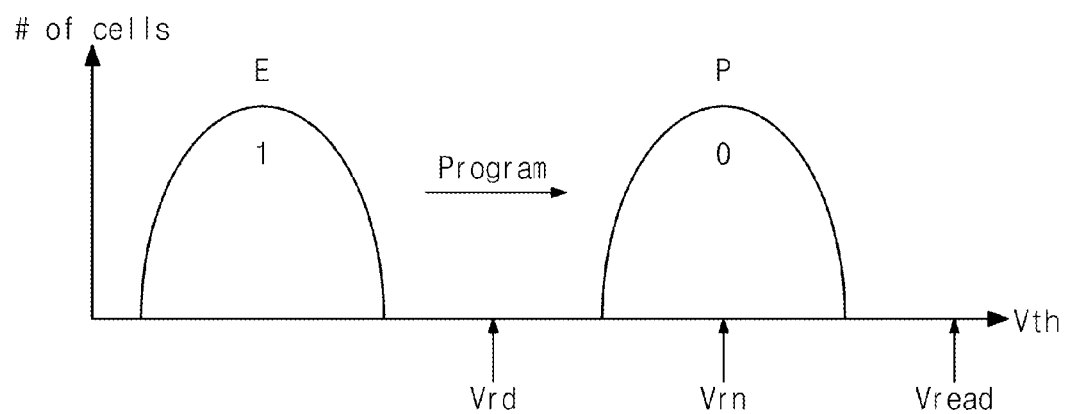
FIG. 4 is a conceptual diagram illustrating exemplary threshold voltage distributions for a single-level memory cell in relation to certain aspects of the inventive concept.

FIG. 4 is a conceptual diagram illustrating nominally defined threshold voltage distributions for an exemplary nonvolatile SLC. Certain control voltages (e.g., Vrd, Vrn and Vread) will be defined in view of the nominal erase threshold voltage distribution "E" and the nominal program threshold voltage "P". Note, that the respective nominal threshold voltage distributions are Gaussian in nature.

As the result of a correctly executed programming operation, a properly functioning SLC will develop a threshold voltage that falls within the nominal program threshold voltage distribution P, whereas an improperly functioning (i.e., operating out of specification) SLC will fail to develop a threshold voltage that falls within the nominal program threshold voltage distribution P. Setting aside all cases wherein the SLC is operating out of specification, it will nonetheless exhibit a threshold voltage that varies across the range of the nominal threshold voltage distribution P. Hence, different SLC will develop different "in specification" threshold voltages in response to the application of substantially identical control signals during a programming operation.

It is this random performance response by even closely proximate individual memory cells to similar programming conditions that allows certain embodiments of the inventive concept to efficiently generate a random number without the need to additionally provide a separate random number generating circuit. That is, certain embodiments of the inventive concept recognize that ordinarily programmed and conventionally provided nonvolatile memory cells constituent to a memory cell array may be subsequently "read" (e.g., have their respective post-programming threshold voltages detected according to a defined random number read voltage) in order to provide random read data serving as the random number applied, for example, to a key generator.

Alternately or additionally, certain programming conditions (e.g., voltage, noise, temperature) variably experienced by individual memory cells during a programming operation will result in non-identical and randomly occurring data being programmed to the memory cells, regardless of the substantially uniform nature of the applied control voltages. Such variably experienced programming conditions are yet another example of a characteristic of the memory cells being programmed.

As a result of such inherent nonvolatile memory cell characteristics and/or externally applied nonvolatile memory cell characteristics, a group (e.g., a page) of SLC intended to be similarly programmed to a data value of "0" will nonetheless include one or more SLC being storing a data value of "1". Such unintended (or "erroneous") data bits are unpredictable in their appearance across the group of memory cells and have the effect of randomizing the programmed data which may later be read as random read data.

Figure 5:
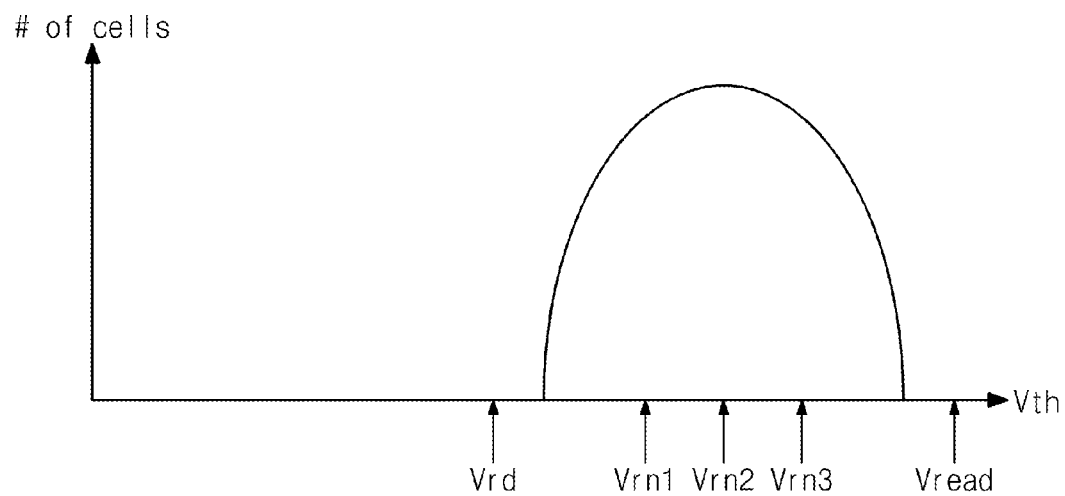
FIG. 5 is a conceptual diagram further illustrating a threshold voltage distribution defined by a one-shot programming operation cell in relation to certain aspects of the inventive concept.

As illustrated in FIGS. 4 and 5, the level of a particular random number read voltage (Vrn), whether singularly used in the example of FIG. 4 or used as a varying plurality in the example of FIG. 5, may be determined in relation to one or more nominal threshold voltage distribution(s) for nonvolatile memory cells. Hence, in certain embodiments of the inventive concept, a random number read voltage (Vrn) may be defined to have a level falling at a center value of a nominal threshold voltage distribution (e.g., the center of the nominal program threshold voltage distribution P in FIG. 4). A read operation performed during a random generating operation may apply this type of random number read voltage (Vrn) to a selected word line WL0 while a non-selection read voltage (Vread) is applied to unselected word lines WL1 to WL63. The resulting random read data may be provided as a random number by the random number generating operation.

While the example of FIG. 4 is drawn to a SLC program operation, other embodiments of the inventive concept may be applied to random number generation in relation to MLC program operation(s).

Certain embodiments of the inventive concept use a so-called "one-shot" programming technique to program a group of nonvolatile memory cells. That is, a programming voltage is applied one-time, without repetition or programming verification, to a group of nonvolatile memory cells. As a result, the group of nonvolatile memory cells will develop respective threshold voltages in response to the one-time applied programming voltage. For example, SLC programming of a page of nonvolatile memory cells to a program state (e.g., a data value of "0") may be accomplished using a one-shot programming operation. Thereafter, one or more random number read voltage(s) may be used to read the data stored in the page of nonvolatile memory cells.

The use of multiple random number read voltages is illustrated in FIG. 5. In FIG. 5, three (3) random number read voltages Vrn1, Vrn2, and Vrn3 are successively applied to a selected word line WL0 in order to read first, second and third random numbers. And since the first, second, and third random number read voltages (Vrn1, Vrn2, and Vrn3) are different in level and are applied at different times to the selected word line WL0, correspondingly different numbers of ON memory cells will be detected during each random number read operations, despite the fact that each random read operation is directed to the same group of programmed memory cells.

The example illustrated in FIG. 5 assumes three (3) random read voltages (Vrn1, Vrn2, and Vrn3) varying in level across, but respectively falling within, a nominal program threshold voltage distribution P. This need not always be the case as any reasonable number of random read voltages may be used, one or more of which may be defined to fall outside the nominal program threshold voltage distribution P.

FIG. 6 is a table illustrating random numbers (RN1, RN2 and RN3) generated by the three (3) random number read voltages of FIG. 5. In FIG. 6, a first random number RN1 is random read data detected from a selected page when the first random number read voltage Vrn1 is applied to the selected word line (e.g., WL0). A second random number RN2 is random read data detected from the selected page when the second random number read voltage Vrn2 is applied to the selected word line WL0, and the third random number RN3 is random read data detected when the third random number read voltage Vrn3 is applied to the selected word line WL0.

As further illustrated in FIG. 6, an encryption key (KEY) may be generated from a combination of the first, second and third random read data (RN1, RN2, and RN3) using, for example, a simple exclusive-OR (XOR) logic gate.

Figure 7:
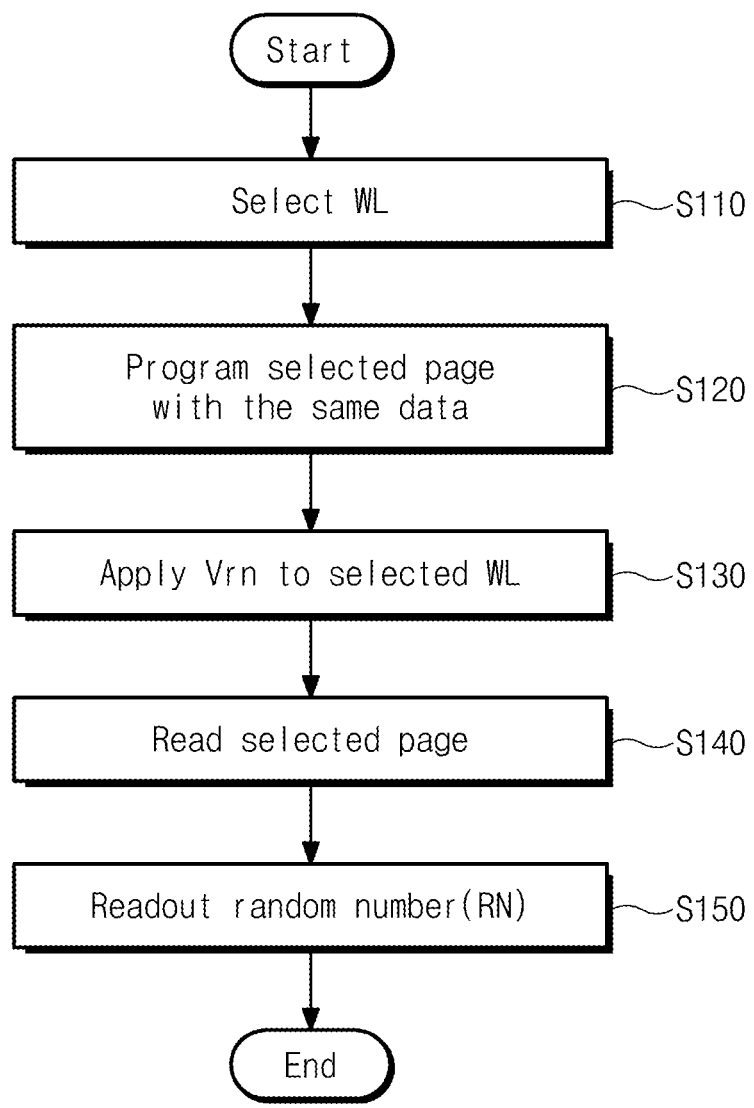
FIG. 7 is a flow chart summarizing a random number generating method that may be used in at least one of the memory systems of FIGS. 1 and 2.

FIG. 7 is a flow chart summarizing one possible method of generating a random number according to an embodiment of the inventive concept. The method of FIG. 7 will be described in the context of the flash memory system and working example described above in relation to FIGS. 2 and 3. In certain embodiments, the method summarized in FIG. 7 will be performed by the flash memory system of FIG. 2 in conjunction with a programming operation.

It is assumed that the flash memory system of FIG. 2 performs read and program operations on a page basis. Accordingly, the illustrated method of FIG. 7 generates a random number by selecting a word line (e.g., WL0) (S110). More particularly, a physical page of flash memory cells commonly controlled by the selected word line WL0 is selected. As a result of this selection, at least one characteristic of the flash memory cells of the selected page will be relied upon to generate the desired random read data. (See, e.g., the selected physical page 1111 of FIG. 3). Alternatively, flash memory cells associated with more than one word line may be used to generate the random number. Successive random number generating operations may use the same group, or different group(s), of flash memory cells within a memory cell array. However, when memory cells associated with a plurality of word lines are used, program or read operation(s) may be independently performed with respect to each respective word line among the selected plurality of word lines.

The constituent memory cells of the selected page 1111 are then programmed to a same state (S120). For example, the flash memory cells of the selected page 1111 may be programmed to the program state P (a data value of "0") of FIG. 4. Accordingly, "0" data values may be loaded to the page buffers in the buffer circuit 1130 connected to the selected page 1111, and then programmed to the flash memory cells of the selected page 1111. In certain embodiments of the inventive concept, the programming of the selected memory cells may be accomplished using one-shot programming techniques, such that the flash memory cells develop a one-shot threshold voltage distribution.

After programming of the selected flash memory cells, a random number read voltage (Vrn) may be applied to the selected word line WL0, while a non-selection read voltage (Vread) is applied to unselected word lines WL1 to WL63 (S130). In certain embodiments of the inventive concept, the random number read voltage (Vrn) may be a center voltage value for a nominal threshold voltage distribution associated with the program state P. The choice of this center voltage value tends to maximize the variability, and hence randomness, of the data read from the programmed flash memory cells during the read operation. Under these control voltage bias conditions, the selected page of flash memory cells may be read (S140). Alternately, multiple random number read voltages may be sequentially applied to the programmed flash memory cells. (See, FIG. 5)

The resulting random read data may then be provided (or readout) as a random number (S150). That is, random read data retrieved from the selected page of flash memory cells may be provided to the key generator 1250 of memory controller 1200. The key generator 1250 may then generate an encryption key using the random read data as a random number provided from the flash memory 1100. The encryption circuit 1260 may then use the encryption key to generate encrypted data from the incoming data to be stored in the flash memory 1100.

In this manner, a flash memory system 1000 according to an embodiment of the inventive concept may generate a random number in relation to at least one characteristic (e.g., the respective programmed threshold voltage) of the flash memory cells of a constituent flash memory cell array. And since the randomness of the resulting read data is generated as a function of the characteristic of the flash memory 1100, the flash memory system 1000 does not require the provision of a separate random number generating circuit.

Figure 8:
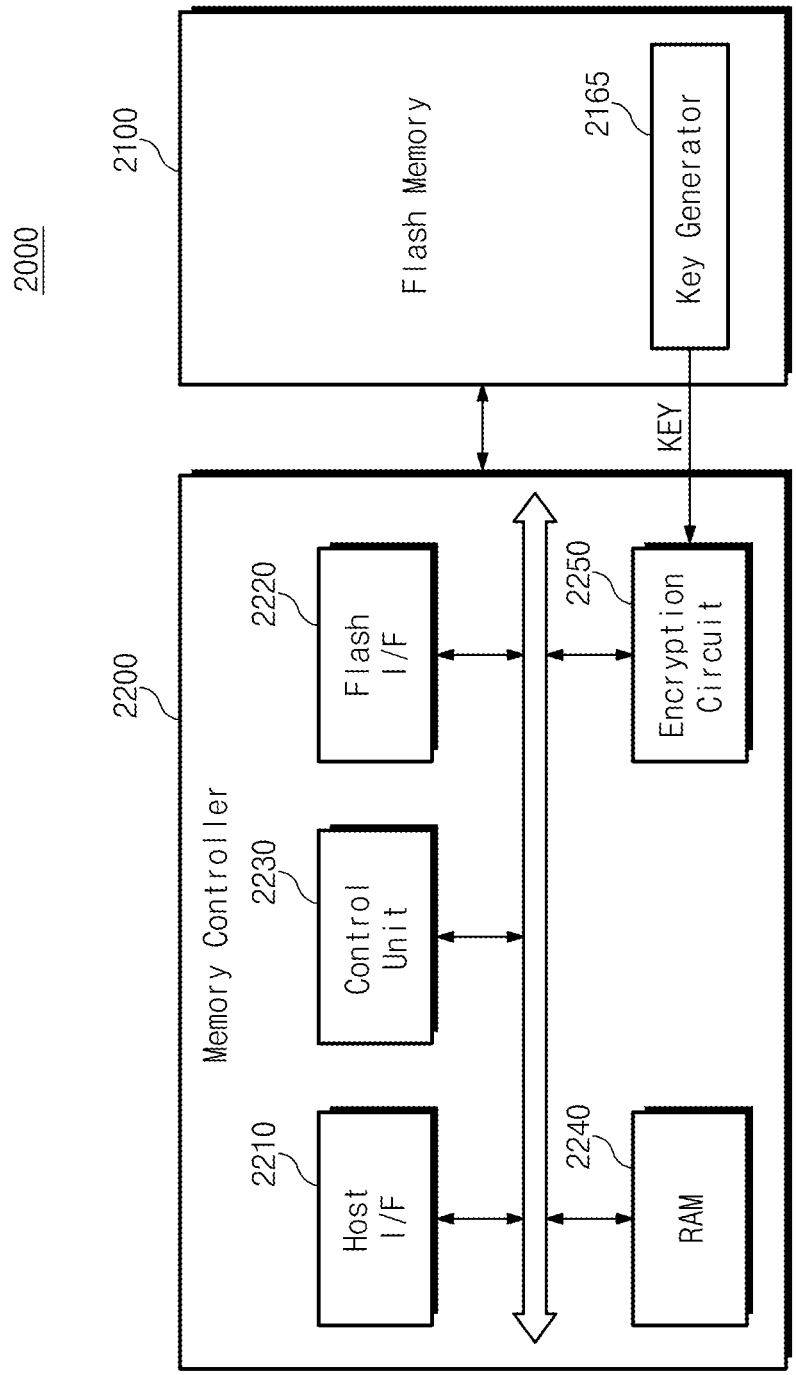
FIG. 8 is a block diagram illustrating a flash memory system according to another embodiment of the inventive concept.

FIG. 8 is a block diagram illustrating a flash memory system according to another embodiment of the inventive concept. Referring to FIG. 8, a flash memory system 2000 generally comprises; a flash memory 2100 and a memory controller 2200. Like the memory controller 1200 of FIG. 2, the memory controller 2200 includes a host interface 2210, a flash interface 2220, a control unit 2230, a RAM 2240, and an encryption circuit 2250. However, the memory controller 2200 does not include a key generator. Rather, a key generator 2165 is incorporated within the flash memory 2100.

Thus, while the flash memory 1100 of FIG. 2 returns a random number (RN) to the key generator 1250 of the memory controller 1200, the flash memory 2100 of FIG. 8 may be used to return an encryption key (KEY) to memory controller 2200. The flash memory 2100 including the key generator 2165 will be described in some additional detail with reference to FIG. 9.

Figure 9:
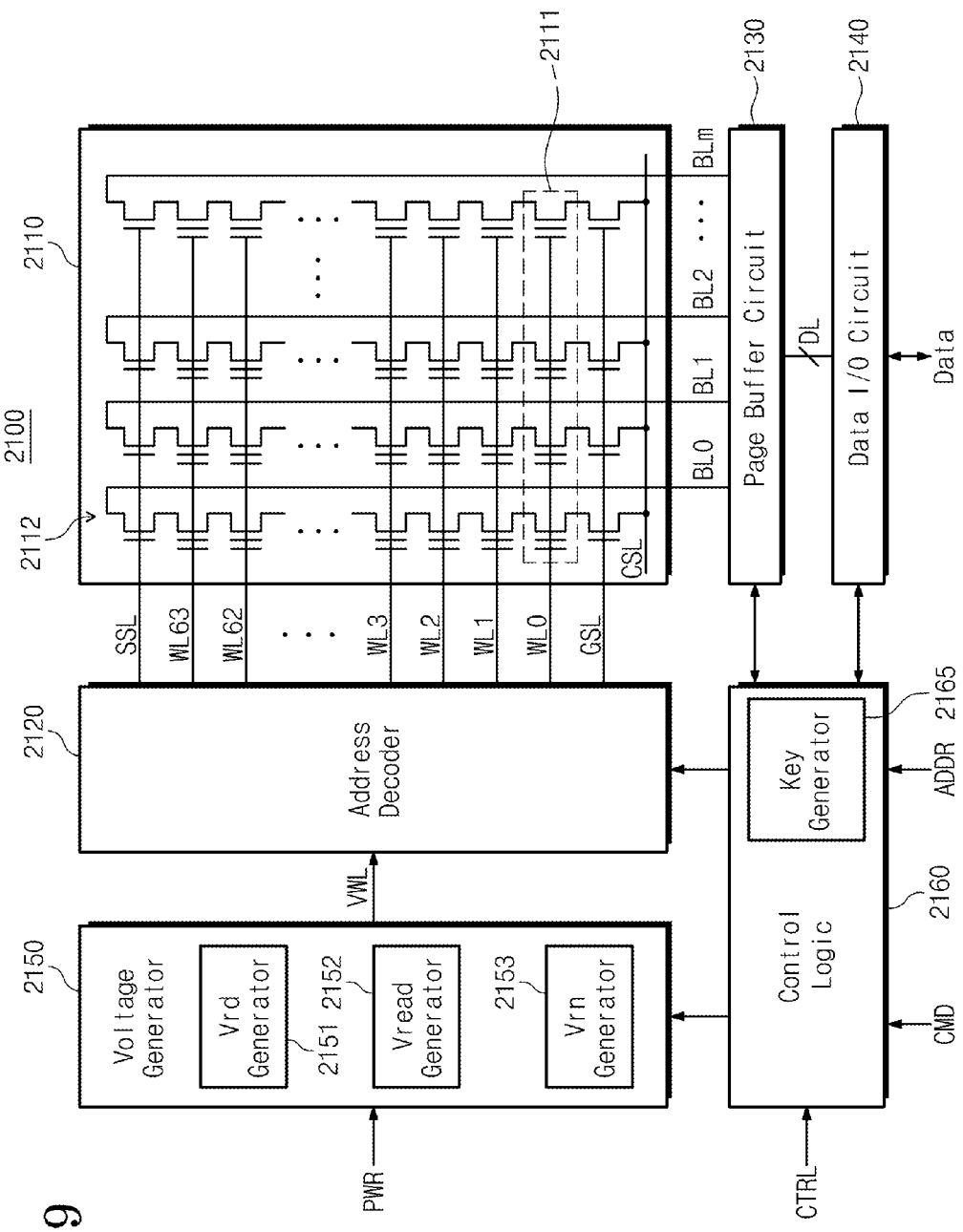
FIG. 9 is a block diagram further illustrating the flash memory system of FIG. 8.

FIG. 9 is a block diagram further illustrating the flash memory 2100 of FIG. 8. Referring to FIG. 9, the flash memory 2100 includes; a memory cell array 2110, an address decoder 2120, a page buffer circuit 2130, a data input/output circuit 2140, a voltage generator 2150, and control logic 2160.

The voltage generator 2150 may include a selection read voltage generator 2151, a non-selection read voltage generator 2152, and a random number read voltage generator 2153. The random number read voltage generator 2153 may be used to generate a random number read voltage to be provided to a selected word line WL0 during a random number generating operation.

In certain embodiments, the control logic 2160 includes a key generator 2165. The key generator 2165 may be used to generate a key using random read data, serving as a random number, provided from the data I/O circuit 2140 during the random number generating operation. The key may be provided to an encryption circuit 2250 of a memory controller 2200. (See, FIG. 8). The encryption circuit 2250 may then encrypt incoming data using the provided key to provide encrypted data to the flash memory 2100 or another memory (not shown).

Thus, the flash memory system 2000 of FIG. 8 may generate a random number using a characteristic of the flash memory cells constituent to the memory system in a manner like that of flash memory system 1000 of FIG. 2.

Figure 10:
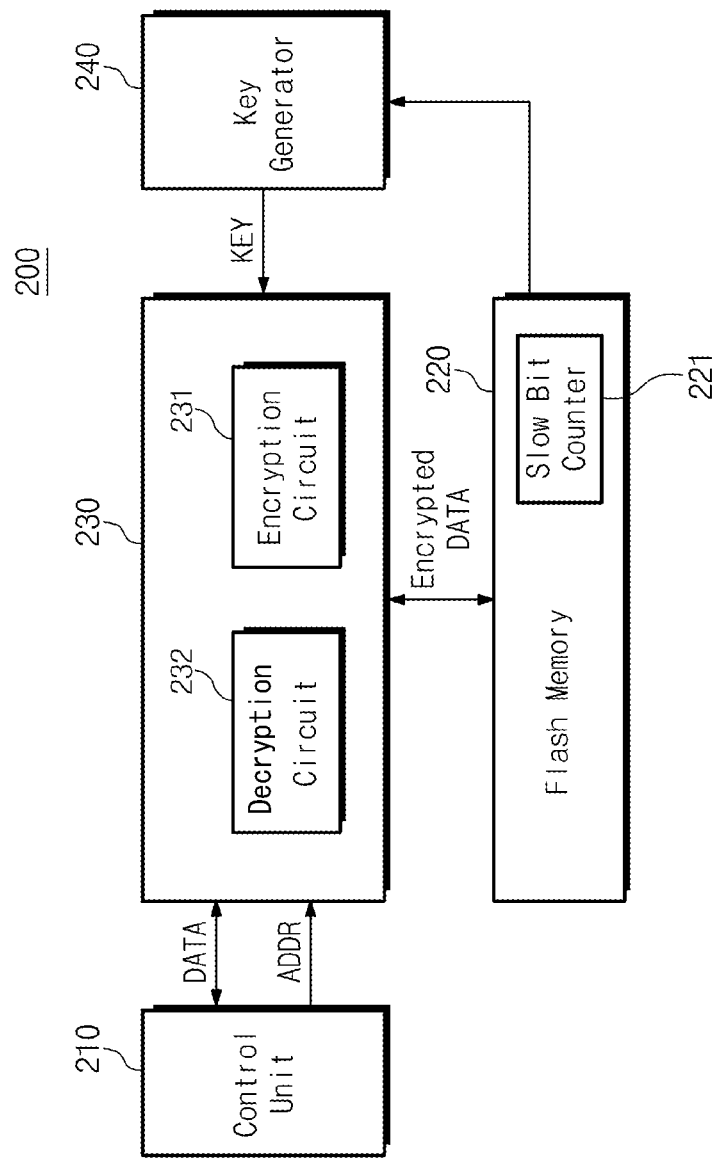
FIG. 10 is a block diagram illustrating a nonvolatile memory system according to still another embodiment of the inventive concept.

FIG. 10 is a block diagram illustrating a memory system according to yet another embodiment of the inventive concept. Referring to FIG. 10, a memory system 200 comprises; a control unit 210, a flash memory 220, a security circuit 230, and a key generator 240.

The flash memory 220 further includes a slow bit counter 221, that may be used, for example, during the program verification of selected flash memory cells. That is, certain conventional flash memory systems recognize the variable speeds with which individual flash memory cells assume a given program state in response to defined programming conditions, such as those defined for one or more iterations of an iterative programming scheme (e.g., incremental step pulse programming or ISSP). The term "slow bit" denotes a flash memory cell that has failed to assume the desired program state at some point during the programming operation. In contrast, the term "fast bit" denotes a flash memory cell distinguished in its relatively rapid ability to assume the desired program state. Thus, for example, following a first programming iteration performed using first control voltage levels, a number "J" out of a group of "N" flash memory cells may be indicated as slow bits. However, following a second programming iteration performed using second control voltages (where at least one of the second control voltages is greater than an analogous first control voltage), a number "K" out of the N flash memory cells may be indicated as slow bits, where K is less than J.

Given this conventionally understood designation of bits (and corresponding flash memory cells) provided as a result of a (complete or partially completed) programming operation, certain embodiments of the inventive concept may use such slow/fast bit results as a characteristic of the implicated flash memory cells. Hence, the memory system 200 may be used to generate a random number (and an encryption key) as a function of slow bits. One approach to the generation of a random number as a function of slow bits in the flash memory 220 will be described hereafter.

Otherwise, the elements of the memory system 200 shown in FIG. 10 are respectively analogous with the elements of the memory system 100 of FIG. 1.

Figure 11:
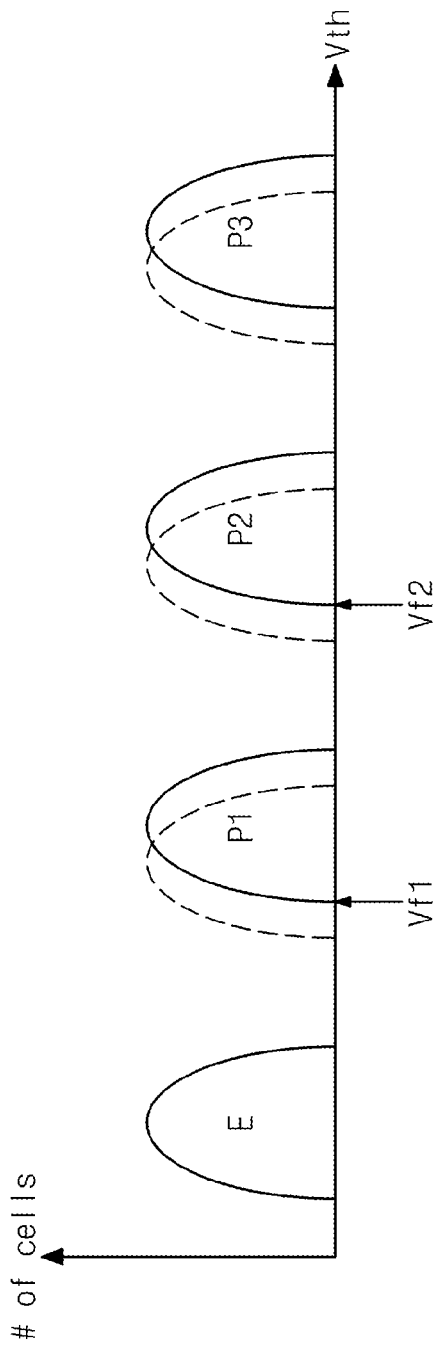
FIG. 11A is a conceptual diagram further illustrating the generation of a random number by a method consistent with embodiments of the inventive concept such as the one shown in FIG. 10.
FIG. 11B is a table illustrating the generation of an encryption key from multiple random numbers (random read data) generated by a method consistent with embodiments of the inventive concept.

FIG. 11A is a conceptual diagram illustrating a random number generating method that may be performed by the memory system 200 of FIG. 10, wherein the flash memory 220 is used to essentially generate random read data using the physical characteristic of slow bits among a group of flash memory cells indicated during a program operation.

Referring to FIG. 11A, a flash MLC may be programmed to one of a plurality of program states P1, P2, and P3, as indicated by its threshold voltage falling within the respectively defined threshold voltage distributions.

Thus, it is assumed that a program voltage is applied to a group of flash MLC during a programming operation being executed by the flash memory 220. Then, one or more program verification step(s) associated with the programming operation are performed. For example, first and second program verification voltages Vf1 and Vf2 may be sequentially applied to a selected word line WL0. Under these assumptions, the first program verification voltage Vf1 may be a voltage used to verify whether flash memory cells have been programmed to the first program state P1, and the second program verification voltage Vf2 may be a voltage used to verify whether the flash memory cells have been programmed to the second program state P2.

Since the number of slow bits failing to exceed the respective first and second program verification voltages Vf1 and Vf2 is random, it is possible to generate a random number using the corresponding number of slow bits. For example, as illustrated in FIG. 11B, first random data (SB1) including a first set of slow bits may be obtained as a result of a first program verification operation performed in relation to the first program verification voltage Vf1. Whereas, second random data (SB2) including a second set of slow bits may be obtained as a result of a second program verification operation performed in relation to the second program verification voltage Vf2. Both the number of slow bits and their respective location within the group of flash memory cells being program verified will vary, and may be deemed a characteristic of the constituent flash memory cells.

In the example further illustrated in FIG. 11B, an encryption key (KEY) is generated by XORing the first random data (SB1) with the second random data (SB2).

Upon consideration of the foregoing example, those skilled in the art will recognize that a random number may be generated without the requirement of providing a separate random number generating circuit, or in certain instances, executing internal memory system operations other than program/read or program verify operations. That is, no specialized computational operation uniquely directed to the generation of a random number need be performed. Rather, characteristic programming/read noise, characteristic programming responses, and similar characteristics of the constituent nonvolatile memory cells of a memory system may be used to generate a random number.

The number of program/erase cycles (P/E) performed by the respective memory cells of a set of selected nonvolatile memory cells may be deemed a characteristic of the nonvolatile memory cells within the context of certain embodiments of the inventive concept. That is, the threshold voltage programming response or slow bit behavior of each nonvolatile memory cell may vary as a function of its P/E wear.

Further, the threshold voltage programming response or slow bit behavior of respective nonvolatile memory cells may vary as a function of operating mode. For example, a memory system may operate in a first mode in which a random number is generated using a characteristic of a threshold voltage distribution for a group of memory cells, and in a second mode in which a random number is generated using a characteristic of a slow bit. In this case, the memory system may change a random number generating methods by switching between the first and second operating modes.

In certain embodiments of the inventive concept, a memory system may use random read data generated using the above-described methods as a seed for a pseudo random number generator. For example, in case that a key generator 1250 of a flash memory system 1000 in FIG. 2 includes a pseudo random number generator to generate a random number, the pseudo random number generator may generate a random number using a seed provided from a flash memory 1100. In this case, the flash memory 1100 may generate a seed by programming the same data at a selected page and providing a seed read voltage to a selected word line to read the selected page. The flash memory 1100 may use a voltage corresponding to a specific voltage level in a threshold voltage distribution as the seed read voltage.

A memory system according to embodiments of the inventive concept may be applied or provided to various products. The memory system according to an embodiment of the inventive concept may be implemented by electronic devices such as a personal computer, a digital camera, a camcorder, a cellular phone, an MP3 player, a PMP, a PSP, a PDA, and the like as well as storage devices such as a memory card, an USB memory, a solid state drive (SSD), and the like.

Figure 12:
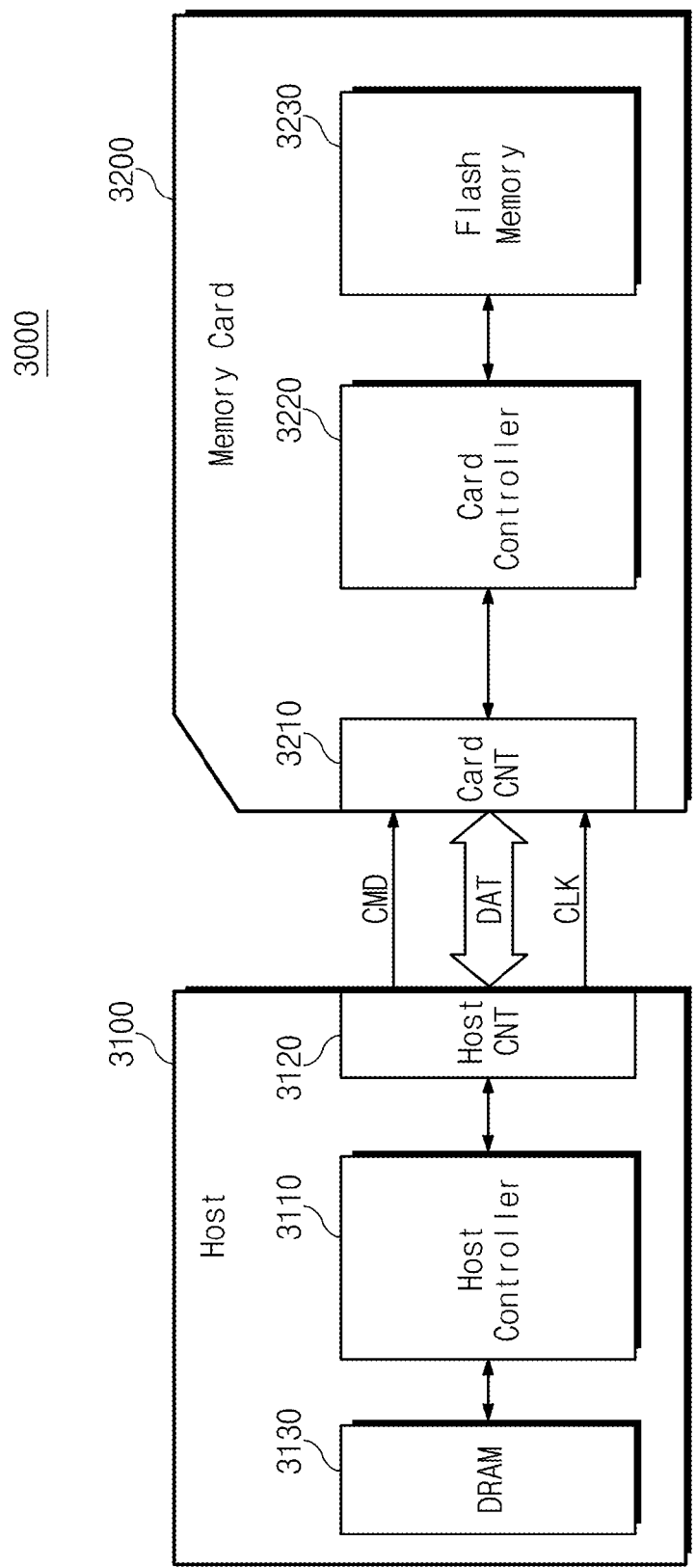
FIG. 12 is a block diagram illustrating a memory card system that may incorporate a memory system according to an embodiment of the inventive concept.

FIG. 12 is a block diagram illustrating a memory card system to which a memory system according to an embodiment of the inventive concept may be applied. A memory card system 3000 generally comprises; a host 3100 and a memory card 3200. The host 3100 may include a host controller 3110, a host connection unit 3120, and a DRAM 3130.

The host 3100 may write data at the memory card 3200 and read data from the memory card 3200. The host controller 3110 may send a command (e.g., a write command), a clock signal CLK generated from a clock generator (not shown) in the host 3100, and data to the memory card 3200 via the host connection unit 3120. The DRAM 3130 may be a main memory of the host 3100.

The memory card 3200 may include a card connection unit 3210, a card controller 3220, and a flash memory 3230. The card controller 3220 may store data at the flash memory 3230 in response to a command input via the card connection unit 3210. The data may be stored in synchronization with a clock signal generated from a clock generator (not shown) in the card controller 3220. The flash memory 3230 may store data transferred from the host 3100. For example, in a case where the host 3100 is a digital camera, the memory card 3200 may store image data.

In the memory card system 3000, the card controller 3220 or the flash memory 3230 may be configured to include a key generator (refer to FIG. 2 or FIG. 8). The memory card system 3000 may generate a random number without a separate random number generating circuit according to the above-described random number generating methods. Thus, the reliability of data may be ensured without adding area to the memory card 3200 required by such a circuit.

Figure 13:
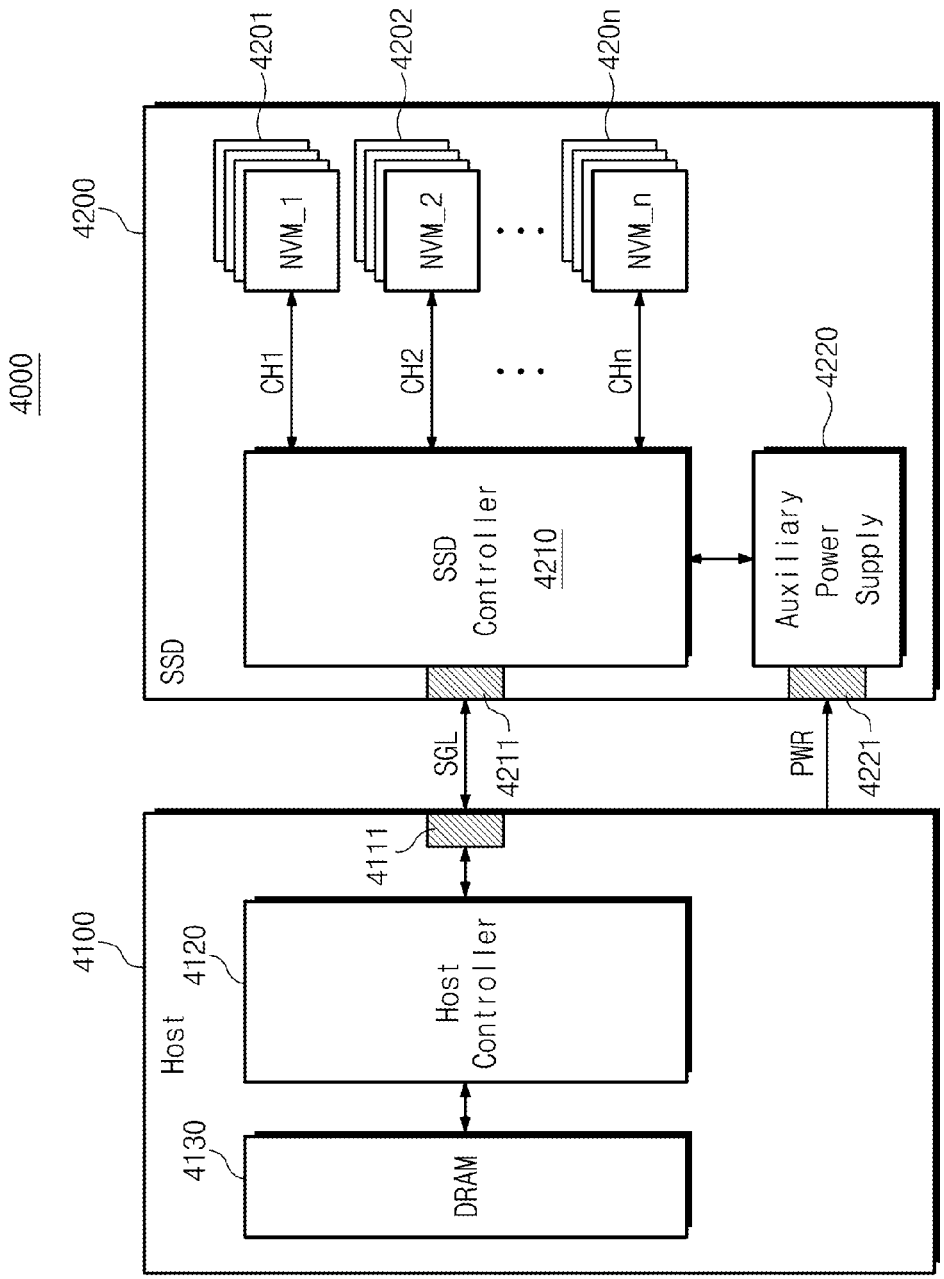
FIG. 13 is a block diagram illustrating a solid state drive (SSD) that may incorporate a memory system according to an embodiment of the inventive concept.

FIG. 13 is a block diagram illustrating a system including a solid state drive (SSD) in which a memory system according to the inventive concept may be applied. Referring to FIG. 13, the system 4000 generally comprises; a host 4100 and an SSD 4200. The host 4100 may include a host interface 4111, a host controller 4120, and a DRAM 4130.

The host 4100 may write data in the SSD 4200 or read data from the SSD 4200. The host controller 4120 may transfer signals SGL such as a command, an address, a control signal, and the like to the SSD 4200 via the host interface 4111. The DRAM 4130 may be a main memory of the host 4100.

The SSD 4200 may exchange signals SGL with the host 4100 via the host interface 4211, and may be supplied with a power via a power connector 4221. The SSD 4200 may include a plurality of nonvolatile memories 4201 to 420$n$, an SSD controller 4210, and an auxiliary power supply 4220. Herein, the nonvolatile memories 4201 to 420$n$ may be implemented by not only a NAND flash memory but also a nonvolatile memory such as PRAM, MRAM, ReRAM, or the like.

The plurality of nonvolatile memories 4201 to 420$n$ may be used as a storage medium of the SSD 4200. The plurality of nonvolatile memories 4201 to 420$n$ may be connected with the SSD controller 4210 via a plurality of channels CH1 to CHn. One channel may be connected with one or more nonvolatile memories. Nonvolatile memories connected with one channel may be connected with the same data bus.

The SSD controller 4210 may exchange signals SGL with the host 4100 via the host interface 4211. Herein, the signals SGL may include a command, an address, data, and the like. The SSD controller 4210 may be configured to write or read out data to or from a corresponding nonvolatile memory according to a command of the host 4100. The SSD controller 4210 will be more fully described with reference to FIG. 14.

The auxiliary power supply 4220 may be connected with the host 4100 via the power connector 4221. The auxiliary power supply 4220 may be charged by a power PWR from the host 4100. The auxiliary power supply 4220 may be placed inside or outside the SSD 4200. For example, the auxiliary power supply 4220 may be put on a main board to supply an auxiliary power to the SSD 4200.

Figure 14:
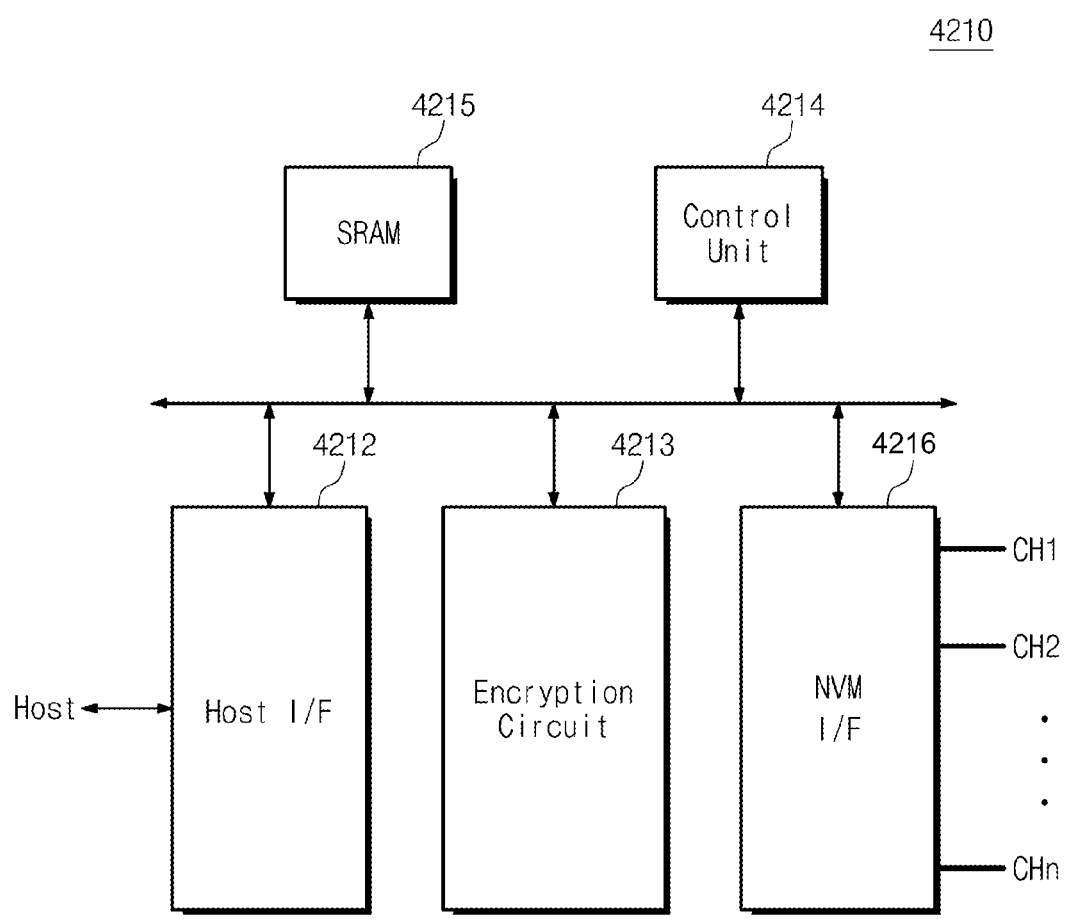
FIG. 14 is a block diagram further illustrating the SSD controller of FIG. 13.

FIG. 14 is a block diagram further illustrating the SSD controller 4210 of FIG. 13. Referring to FIG. 14, the SSD controller 4210 includes an NVM interface 4216, a host interface 4212, an encryption circuit 4213, a control unit 4214, and an SRAM 4215.

The NVM interface 4216 may scatter data transferred from a main memory of a host 4100 to channels CH1 to CHn, respectively. The NVM interface 4216 may transfer data read from nonvolatile memories 4201 to 420n to the host 4100 via the host interface 4212.

The host interface 4212 may provide an interface with an SSD 4200 according to the protocol of the host 4100. The host interface 4212 may communicate with the host 4100 using USB (Universal Serial Bus), SCSI (Small Computer System Interface), PCI express, ATA, PATA (Parallel ATA), SATA (Serial ATA), SAS (Serial Attached SCSI), or the like. The host interface 4212 may also perform a disk emulation function which enables the host 4100 to recognize the SSD 4200 as a hard disk drive (HDD).

The encryption circuit 4213 may encrypt data using a key provided from a key generator included in the SSD controller 4210 or each of nonvolatile memories 4201 to 420n. The control unit 4214 may analyze and process signals input from the host 4100. The control unit 4214 may control the host 4100 or the nonvolatile memories 4201 to 420n through the host interface 4212 or the NVM interface 4216. The control unit 4214 may control the nonvolatile memories 4201 to 420n according to firmware to drive the SSD 4200.

The SRAM 4215 may be used to drive software which efficiently manages the nonvolatile memories 4201 to 420n. The SRAM 4215 may store metadata input from a main memory of the host 4100 or cache data. Upon a sudden power-off, metadata or cache data stored in the SRAM 4215 may be stored in the nonvolatile memories 4201 to 420n using an auxiliary power supply 4220.

Returning to FIG. 13, the system 4000 according to an embodiment of the inventive concept may generate a random number using a characteristic of the constituent nonvolatile memory cells. Since a random number may be generated in this manner, the system 4000 does not require a separate random number generating circuit.

Figure 15:
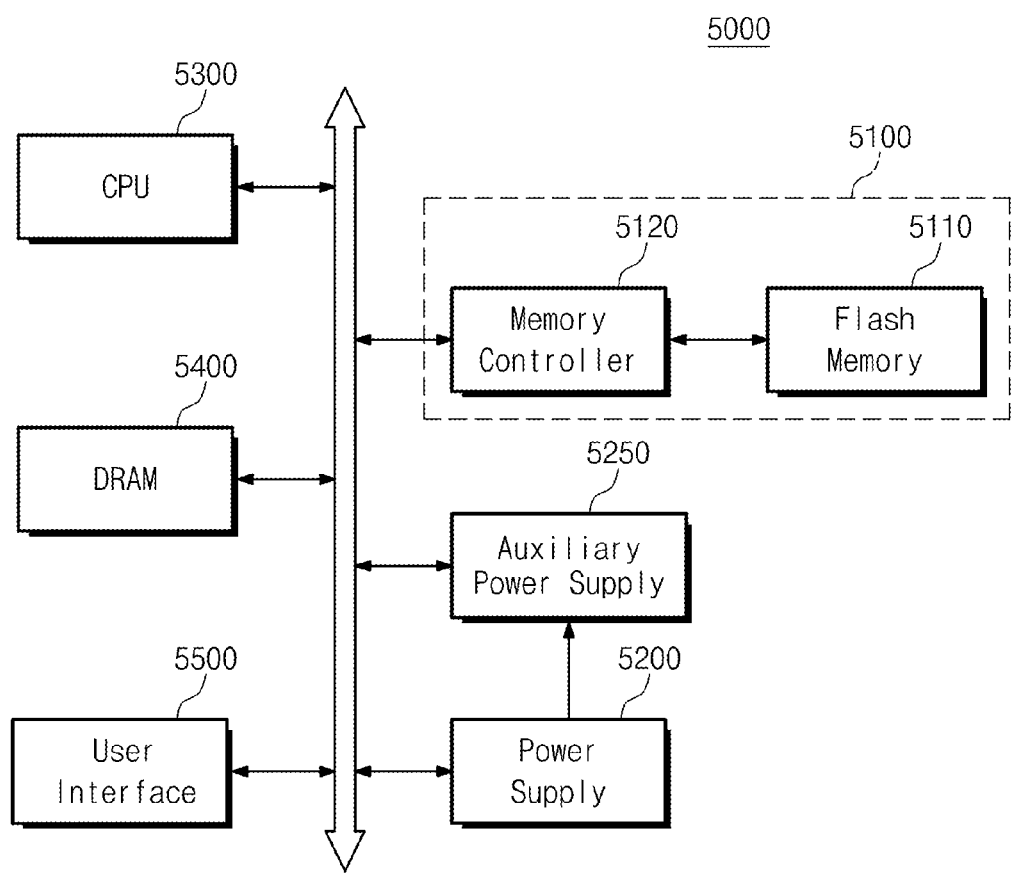
FIG. 15 is a block diagram illustrating an electronic device that may incorporate a flash memory system according to an embodiment of the inventive concept.

FIG. 15 is a block diagram illustrating an electronic device that may incorporate a flash memory system according to an embodiment of the inventive concept. Herein, an electronic device 5000 may be a personal computer or a handheld electronic device such as a notebook computer, a cellular phone, a PDA, a camera, or the like.

Referring to FIG. 15, the electronic device 5000 comprises; a memory system 5100, a power supply device 5200, an auxiliary power supply 5250, a CPU 5300, a DRAM 5400, and a user interface 5500. The memory system 5100 may include a flash memory 5110 and a memory controller 5120.

The memory system 5100 can be embedded within the electronic device 5000.

A memory system according to certain embodiments of the inventive concepts may incorporate a memory cell array having a three-dimensional (3D) structure.

Figure 16:
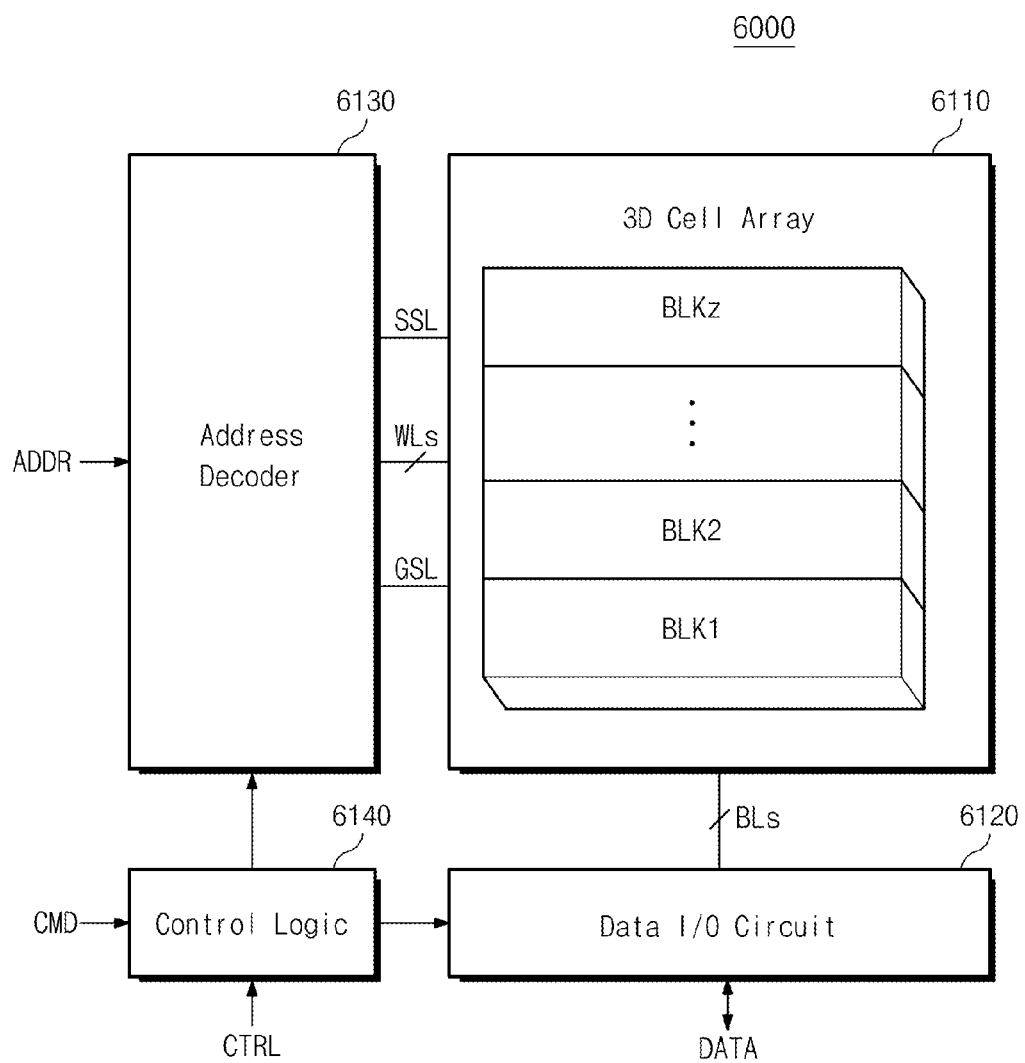
FIG. 16 is a block diagram illustrating a flash memory system incorporating a 3D memory cell array that may be operated according to an embodiment of the inventive concept.

Thus, according to another embodiment of the inventive concept, FIG. 16 is a block diagram illustrating a flash memory 6000 comprising; a three-dimensional (3D) cell array 6110, a data input/output circuit 6120, an address decoder 6130, and control logic 6140.

The 3D memory cell array 6110 includes a plurality of memory blocks BLK1 to BLKz, each of which is formed with a three-dimensional (or vertical) structure. For a memory block having a two-dimensional (horizontal) structure, memory cells may be formed in a direction parallel with a substrate. For a memory block having a three-dimensional structure, memory cells may be formed in a direction perpendicular to the substrate. Each of the memory blocks BLK1 to BLKz may be an erase unit of the flash memory 6000.

The data input/output circuit 6120 may be connected with the 3D cell array 6110 via a plurality of bit lines. The data input/output circuit 6120 may receive data from an external device or output data read from the 3D memory cell array 6110 to the external device. The address decoder 6130 may be connected with the 3D cell array 6110 via a plurality of word lines and selection lines GSL and SSL. The address decoder 6130 may select the word lines in response to an address ADDR.

The control logic 6140 may control programming, erasing, reading, etc. of the flash memory 6000. For example, during programming the control logic 6140 may control the address decoder 6130 and the data input/output circuit 6120 such that a program voltage is supplied to a selected word line and data is programmed.

Figure 17:
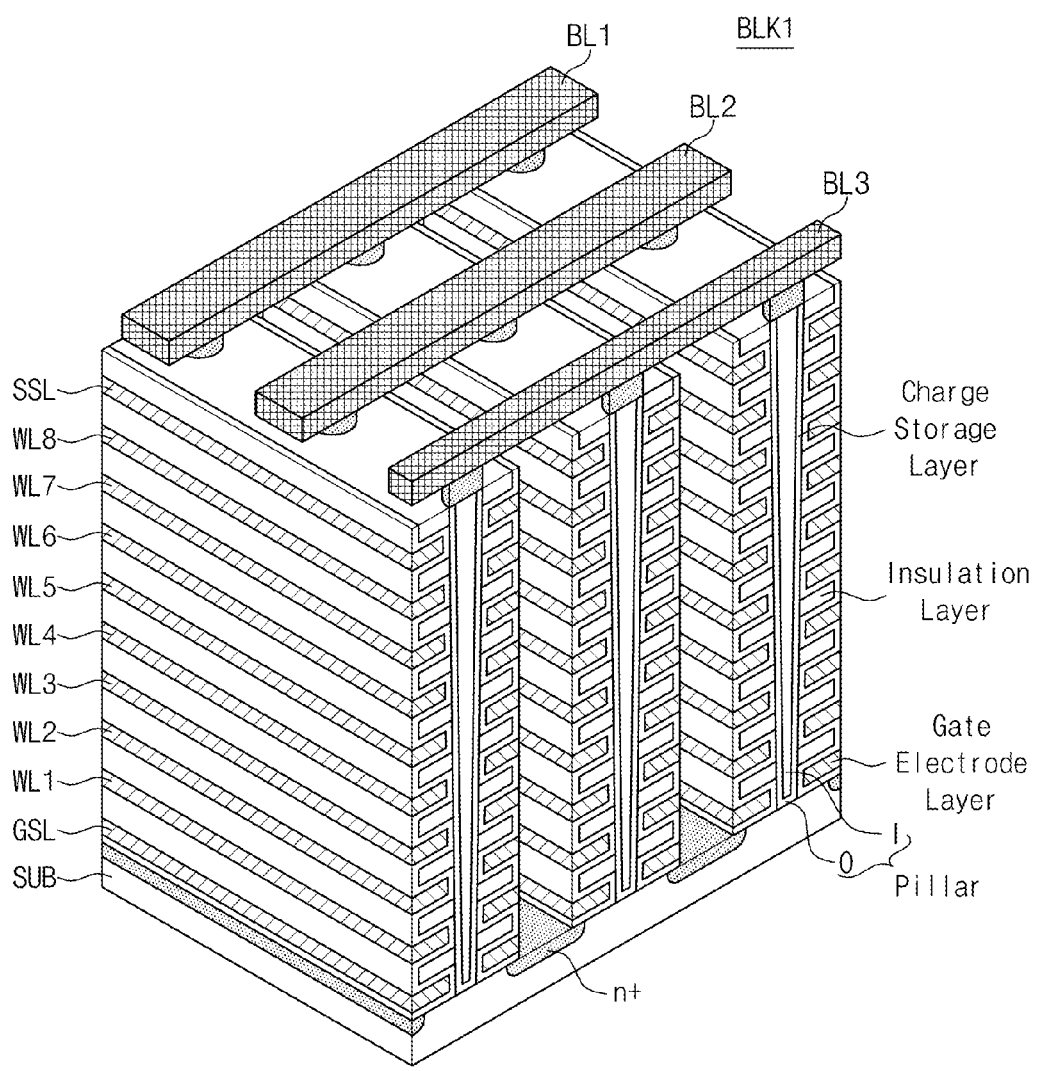
FIG. 17 is a perspective view further illustrating one possible structure for the 3D memory cell array of FIG. 16.

FIG. 17 is a perspective view further illustrating in relevant portion the 3D memory cell array structure of a memory block of FIG. 16. Referring to FIG. 17, a memory block BLK1 is formed in a direction perpendicular to a substrate SUB. An n+ doping region may be formed at the substrate SUB. A gate electrode layer and an insulation layer may be deposited on the substrate SUB in turn. A charge storage layer may be formed between the gate electrode layer and the insulation layer.

If the gate electrode layer and the insulation layer are patterned in a vertical direction, a V-shaped pillar may be formed. The pillar may be connected with the substrate SUB via the gate electrode layer and the insulation layer. An outer portion O of the pillar may be formed of a channel semiconductor, and an inner portion I thereof may be formed of an insulation material such as silicon oxide.

The gate electrode layer of the memory block BLK1 may be connected with a ground selection line GSL, a plurality of word lines WL1 to WL8, and a string selection line SSL. The pillars of the memory block BLK1 may be connected with a plurality of bit lines BL1 to BL3. In FIG. 17, there is illustrated the case that one memory block BLK1 has two selection lines SSL and GSL, eight word lines WL1 to WL8, and three bit lines BL1 to BL3. However, the inventive concept is not limited thereto.

Figure 18:
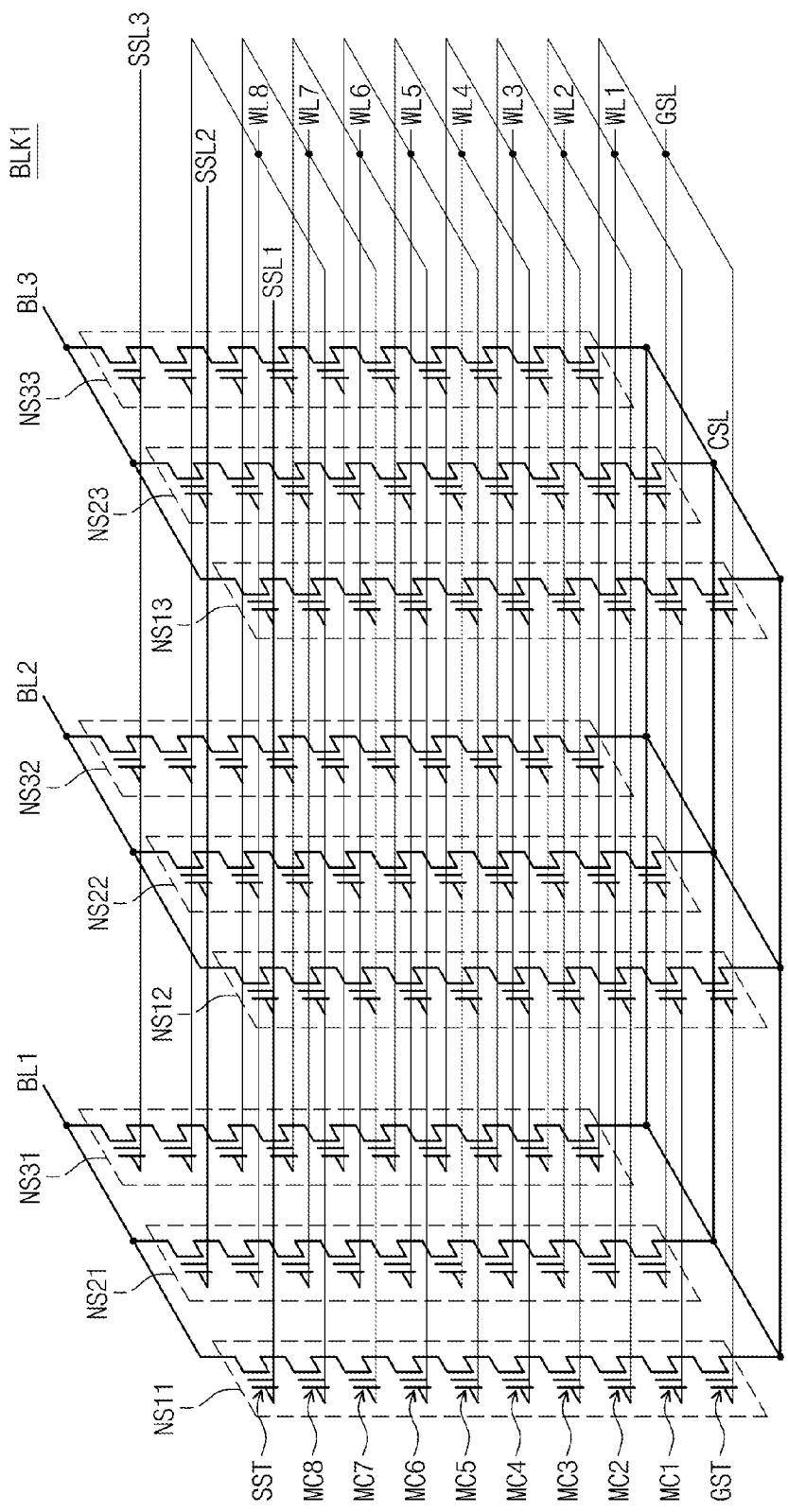
FIG. 18 is a diagram illustrating in relevant part an equivalent circuit for the memory cell array of FIG. 17.

FIG. 18 is a diagram illustrating in relevant portion an equivalent circuit for the memory block of FIG. 17. Referring to FIG. 18, NAND strings NS11 to NS33 may be connected between bit lines BL1 to BL3 and a common source line CSL. Each NAND string (e.g., NS11) may include a string selection transistor SST, a plurality of memory cells MC1 to MC8, and a ground selection transistor GST.

The string selection transistors SST may be connected with string selection lines SSL1 to SSL3. The memory cells MC1 to MC8 may be connected with corresponding word lines WL1 to WL8, respectively. The ground selection transistors GST may be connected with ground selection line GSL. In each NAND string, the string selection transistor SST may be connected with a bit line, and the ground selection transistor GST may be connected with the common source line CSL.

Word lines (e.g., WL1) having the same height may be connected in common, and the string selection lines SSL1 to SSL3 may be separated from one another. At programming of memory cells (constituting a page) connected with a first word line WL1 and included in NAND strings NS11, NS12, and NS13, there may be selected a first word line WL1 and a first string selection line SSL1.

While the inventive concept has been described with reference to exemplary embodiments, it will be apparent to those skilled in the art that various changes and modifications may be made without departing from the scope of the following claims. Therefore, it should be understood that the above embodiments are not limiting, but illustrative in nature.

What is claimed is:

1. A method of generating a random number in a memory of non-volatile memory cells programmable to any one of a plurality of program states, the method comprising: programming each of a plurality of the non-volatile memory cells to a same program state among the plurality of program states; reading data from the programmed non-volatile memory cells using a random number read voltage selected in accordance with a characteristic of the non-volatile memory cells; and providing the data read from the programmed non-volatile memory cells as the random number, wherein the random number read voltage is selected to be within a nominal threshold voltage distribution of the programmed non-volatile memory cells.

2. The method of claim 1, wherein said providing the data is performed without use of a separate random number generating circuit.

3. The method of claim 1, wherein the characteristic of the non-volatile memory cells is the nominal threshold voltage distribution for the non-volatile memory cells in response to the programming of the non-volatile memory cells.

4. The method of claim 1, wherein the random number read voltage is selected to be at a center of the nominal threshold voltage distribution.

5. A method of generating a random number in a memory of non-volatile memory cells, the method comprising:
programming each of a plurality of the non-volatile memory cells to a same program state;
reading the programmed non-volatile memory cells using a random number read voltage selected in accordance with a characteristic of the non-volatile memory cells to generate random read data; and
generating the random number from the random read data, wherein the characteristic of the non-volatile memory cells is a slow cell response by at least one of the non-volatile memory cells in response to the programming of the non-volatile memory cells.

6. The method of claim 1, wherein the programming of the non-volatile memory cells is a 1-shot programming operation.

7. The method of claim 1, wherein each one of the non-volatile memory cells is a single level memory cell (SLC).

8. The method of claim 1, wherein the programmed non-volatile memory cells are arranged in a physical page commonly connected to a word line.

9. A method, comprising:
obtaining random read data from programmed non-volatile memory cells using a random number read voltage selected in view of a characteristic of the non-volatile memory cells; and
generating a random number by logically combining the random read data,
wherein the random number read voltage is selected to be within a nominal threshold voltage distribution for the non-volatile memory cells in response to programming of the non-volatile memory cells.

10. The method of claim 9, further comprising:
generating an encryption key from the random number; and
using the encryption key to encrypt data received by a memory system including a memory controller and a memory including the non-volatile memory cells.

11. The method of claim 10, wherein the generating of the encryption key is performed by a key generator disposed in one of the memory controller and the memory.

12. The method of claim 9, wherein the random number read voltage is selected to be at a center of the nominal threshold voltage distribution.

13. A method, comprising:
obtaining random read data from programmed non-volatile memory cells using a random number read voltage selected in view of a characteristic of the non-volatile memory cells,
wherein the random number read voltage is a program verification voltage used to verify whether each of the non-volatile memory cells responds as a slow cell during the programming of the non-volatile memory cells.

14. An encryption key generation method, comprising:
programming non-volatile memory cells using a program voltage, wherein each of the non-volatile memory cells is specified to exhibit a threshold voltage falling within a same nominal threshold voltage distribution in response to the programming;
generating random read data by reading the programmed non-volatile memory cells using at least one random number read voltage falling within the nominal threshold voltage distribution;
applying the random read data to a key generator as a random number; and
using the key generator to generate an encryption key.

15. The method of claim 14, wherein each one of the non-volatile memory cells is a single level memory cell (SLC).

16. The method of claim 15, wherein the programming of the non-volatile memory cells comprises applying the program voltage to the non-volatile memory cells using a 1-shot programming operation.

17. The method of claim 14, wherein the at least one random number read voltage comprises a first random number read voltage generating corresponding first random read data, and a second random number read voltage generating corresponding second random read data, and the method further comprises:
logically combining the first and second random read data to generate the random read data.

18. The method of claim 1, wherein a non-volatile memory device including the plurality of the non-volatile memory cells includes a plurality of cell strings connected to a bit line,
wherein each cell string includes memory cells, from among the plurality of the non-volatile memory cells, connected to one another in series, and wherein memory cells at equal height, from among the plurality of the non-volatile memory cells, are connected to a word line.

19. The method of claim 5, wherein a non-volatile memory device including the plurality of the non-volatile memory cells includes a plurality of cell strings connected to a bit line, wherein each cell string includes memory cells, from among the plurality of the non-volatile memory cells, connected to one another in series, and wherein memory cells at equal height, from among the plurality of the non-volatile memory cells, are connected to a word line.

20. The method of claim 9, wherein a non-volatile memory device including the non-volatile memory cells includes a plurality of cell strings connected to a bit line, wherein each cell string includes memory cells, from among the non-volatile memory cells, connected to one another in series, and wherein memory cells at equal height, from among the non-volatile memory cells, are connected to a word line.

21. The method of claim 13, wherein a non-volatile memory device including the non-volatile memory cells includes a plurality of cell strings connected to a bit line, wherein each cell string includes memory cells, from among the non-volatile memory cells, connected to one another in series, and wherein memory cells at equal height, from among the non-volatile memory cells, are connected to a word line.

22. The method of claim 14, wherein a non-volatile memory device including the non-volatile memory cells includes a plurality of cell strings connected to a bit line, wherein each cell string includes memory cells, from among the non-volatile memory cells, connected to one another in series, and wherein memory cells at equal height, from among the non-volatile memory cells, are connected to a word line.

\* \* \* \* \*